(12) United States Patent
Zhang et al.

(10) Patent No.: US 12,200,804 B2
(45) Date of Patent: Jan. 14, 2025

(54) CONTEXT FETCH PROCEDURE FOR INACTIVE DIRECT DATA TRANSMISSION

(71) Applicant: Apple Inc., Cupertino, CA (US)

(72) Inventors: Dawei Zhang, Cupertino, CA (US); Haijng Hu, Cupertino, CA (US); Murtaza A. Shikari, Cupertino, CA (US); Sarma V. Vangala, Cupertino, CA (US); Srinivasan Nimmala, Cupertino, CA (US); Fangli Xu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,240

(22) PCT Filed: Sep. 25, 2020

(86) PCT No.: PCT/CN2020/117809
§ 371 (c)(1),
(2) Date: Oct. 14, 2021

(87) PCT Pub. No.: WO2022/061732
PCT Pub. Date: Mar. 31, 2022

(65) Prior Publication Data
US 2023/0217528 A1 Jul. 6, 2023

(51) Int. Cl.
*H04W 76/27* (2018.01)
*H04W 52/02* (2009.01)
(52) U.S. Cl.
CPC ........ *H04W 76/27* (2018.02); *H04W 52/0229* (2013.01)

(58) Field of Classification Search
CPC .................................................... H04W 76/27
See application file for complete search history.

(56) References Cited

U.S. PATENT DOCUMENTS

| 2019/0191483 A1 | 6/2019 | Ryoo et al. |
| 2019/0215798 A1 | 7/2019 | Kim et al. |
| 2020/0037210 A1 | 1/2020 | Rugeland et al. |
| 2020/0077307 A1 | 3/2020 | Li et al. |

(Continued)

FOREIGN PATENT DOCUMENTS

| CN | 108713337 A | 10/2018 |
| CN | 110651511 A | 1/2020 |

(Continued)

OTHER PUBLICATIONS

Ericsson: "Remaining security aspects for EDT", 3GPP Draft; R2-1807801, vol. RAN WG2, No. Busan, Republic of Korea; May 21, 2018-May 25, 2018 May 20, 2018.

(Continued)

*Primary Examiner* — Ricky Q Ngo
*Assistant Examiner* — Stephen N Steiner
(74) *Attorney, Agent, or Firm* — Womble Bond Dickinson (US) LLP

(57) ABSTRACT

A method and apparatus of a device that communicates data between a user equipment (UE) device and a base station when the user equipment is in the inactive state is described. In some embodiments, the last serving base station of the UE and the new base station of the UE coordinate with each other to complete the transfer of data while the UE is in the inactive state.

19 Claims, 22 Drawing Sheets

(56) References Cited

U.S. PATENT DOCUMENTS

| | | | |
|---|---|---|---|
| 2020/0275512 A1 | 8/2020 | Wu et al. | |
| 2020/0314714 A1* | 10/2020 | Jung | H04W 76/27 |
| 2020/0351723 A1* | 11/2020 | Kim | H04W 36/08 |
| 2021/0136649 A1 | 5/2021 | Shah et al. | |
| 2021/0168894 A1* | 6/2021 | Sha | H04L 5/0053 |
| 2023/0156820 A1* | 5/2023 | Wu | H04W 12/0431 370/329 |

FOREIGN PATENT DOCUMENTS

| | | |
|---|---|---|
| CN | 111418260 A | 7/2020 |
| CN | 111434131 A | 7/2020 |
| WO | 2018030866 A1 | 2/2018 |
| WO | 2019/149258 A1 | 8/2019 |

OTHER PUBLICATIONS

European Search Report and Search Opinion received for European Application No. 23200247.7, mailed on Dec. 21, 2023, 11 pages.

International Preliminary Report on Patentability received for PCT Patent Application No. PCT/CN2020/117809, mailed on Apr. 3, 2023, 6 pages.

International Search Report and Written Opinion received for PCT Patent Application No. PCT/CN2020/117809, mailed on Jun. 17, 2021, 7 pages.

Qualcomm Incorporated: "RACH based uplink small data transmission with or without anchor relocation", 3GPP Draft; R2-2007541, vol. RAN WG2, No. Online; Aug. 17, 2020-Aug. 28, 2020 Aug. 7, 2020.

Supplementary European Search Report and Search Opinion received for European Application No. 20954584.7, mailed on Dec. 19, 2023, 18 pages.

ZTE Corporation et al., "Details of RRC-based IDT", 3GPP Draft; R2-2007449, vol. RAN WG2, No. Aug. 17, 2020-Aug. 28, 2020 Aug. 6, 2020.

Non-Final Office Action received for U.S. Appl. No. 18/230,599, mailed on Apr. 25, 2024, 22 pages.

Office Action received in related Chinese Application No. 202080105149.X, mailed Oct. 23, 2024, 48 pages.

* cited by examiner

Receive first user plane uplink data (e.g., an RLC PDU) transmitted from a user equipment (UE) while the UE was in the Radio Resource Control (RRC) inactive (RRC_INACTIVE) state
1121

Receive control information (e.g., an RRC message, a UE ID, and MAC-I for security checking and UE identification, etc.) transmitted from the UE while the UE was in the RRC_INACTIVE state, along with the first user plane uplink data
(optional)
1122

Send both a first message (e.g., a RETREIVE UE CONTEXT REQUEST message) to a second base station (e.g., the last serving gNB) to request UE context and the first user plane uplink data, where the first user plane uplink data is for forwarding by the second base station to the core network (CN)
1123

Receive a second message (e.g., a RETREIVE UE CONTEXT RESPONSE message) from the second base station in response to the first message
1124

Receive additional user plane uplink data (e.g., one or more RLC PDUs) transmitted from the UE while the UE was in the RRC_INACTIVE state and send the additional uplink data to the second base station for forwarding to the CN by the second base station
1125

Receive user plane downlink data (e.g., one or more RLC PDUs) for the UE from the CN via the second base station while the UE was in the RRC_INACTIVE state, assembling the user plane downlink data from the second base station, and transmit assembled user plane downlink data to the UE as a downlink transmission
1126

FIG. 11B

```
┌─────────────────────────────────────────────────────────────────────┐
│ Receive first user plane uplink data (e.g., an RLC PDU) transmitted │
│ from a user equipment (UE) while the UE was in the Radio Resource   │
│ Control (RRC) inactive (RRC_INACTIVE) state                          │
│                              1321                                    │
└─────────────────────────────────────────────────────────────────────┘
                                   ▼
┌─────────────────────────────────────────────────────────────────────┐
│ Receive control information (e.g., an RRC message, a UE ID, and     │
│ MAC-I for security checking and UE identification, etc.) transmitted│
│ from the UE while the UE was in the RRC_INACTIVE state, along with  │
│ the first user plane uplink data                                    │
│                          (optional)                                  │
│                              1322                                    │
└─────────────────────────────────────────────────────────────────────┘
                                   ▼
┌─────────────────────────────────────────────────────────────────────┐
│ Send both a first message (e.g., a RETRIEVE UE CONTEXT REQUEST      │
│ message) to a second base station (e.g., the last serving gNB) to   │
│ request UE context and the first user plane uplink data, where the  │
│ first user plane uplink data is for forwarding by the second base   │
│ station to the core network (CN)                                    │
│                              1323                                    │
└─────────────────────────────────────────────────────────────────────┘
                                   ▼
┌─────────────────────────────────────────────────────────────────────┐
│ Receive a second message (e.g., a RETRIEVE UE CONTEXT RESPONSE      │
│ message) from the second base station in response to the first      │
│ message, the second message containing partial context to enable    │
│ the second base station to operate as an anchor node    1324         │
└─────────────────────────────────────────────────────────────────────┘
                                   ▼
┌─────────────────────────────────────────────────────────────────────┐
│ Send a data forwarding address indication (e.g., Xn-U address       │
│ indication) to the second base station                               │
│                              1325                                    │
└─────────────────────────────────────────────────────────────────────┘
                                   ▼
┌─────────────────────────────────────────────────────────────────────┐
│                Send a path switch message to the CN                  │
│                              1326                                    │
└─────────────────────────────────────────────────────────────────────┘
                                   ▼
┌─────────────────────────────────────────────────────────────────────┐
│ Temporarily operate as an anchor node for the UE while the UE is in │
│ the RRC_INACTIVE state, including receiving additional uplink data  │
│ transmitted by the UE while the UE was in the RRC_INACTIVE state and│
│ forwarding the additional user plane uplink data to the CN, and/or  │
│ receiving user plane downlink data for the UE from the CN while the │
│ UE is in the RRC_INACTIVE state, assembling the user plane downlink │
│ data from the second base station, and transmitting assembled user  │
│ plane downlink data to the UE as a downlink transmission             │
│                              1327                                    │
└─────────────────────────────────────────────────────────────────────┘
                                   ▼
┌─────────────────────────────────────────────────────────────────────┐
│ Send a transmission complete indication to the second base station  │
│ and cease operation as an anchor node for the UE, where the         │
│ transmission complete indication indicates completion of user plane │
│ data transmission between the UE and the CN while the UE is in in   │
│ the RRC_INACTIVE state                                              │
│                              1328                                    │
└─────────────────────────────────────────────────────────────────────┘
```

FIG. 13B

```
┌─────────────────────────────────────────────────────────────────────────────┐
│ Receive a UE context that a second base station (e.g., a last serving gNB)  │
│ sends to one or more other base stations that can potentially act as the    │
│ new base station for a UE                                                   │
│                                 1621                                        │
└─────────────────────────────────────────────────────────────────────────────┘
                                    ▼
┌─────────────────────────────────────────────────────────────────────────────┐
│ Receive a paging message from the second base station indicating that a     │
│ transmission from CN with downlink data has occurred while the UE is in     │
│ the RRC_INACTIVE state                                                      │
│                                 1622                                        │
└─────────────────────────────────────────────────────────────────────────────┘
                                    ▼
┌─────────────────────────────────────────────────────────────────────────────┐
│            Page the UE to notify the UE of a downlink transmission          │
│                                 1623                                        │
└─────────────────────────────────────────────────────────────────────────────┘
                                    ▼
┌─────────────────────────────────────────────────────────────────────────────┐
│ Receive first user plane uplink data transmitted from the UE while the UE   │
│ is in the RRC_INACTIVE state and operate as an anchor node for the UE in    │
│ response to receiving the first user plane uplink data from the UE          │
│                                 1624                                        │
└─────────────────────────────────────────────────────────────────────────────┘
                                    ▼
┌─────────────────────────────────────────────────────────────────────────────┐
│ Send a data forwarding address indication (e.g., Xn-U address indication)   │
│ to the second base station after receiving the first user plane uplink      │
│ data transmitted from the UE while the UE is in the RRC_INACTIVE state      │
│                                 1625                                        │
└─────────────────────────────────────────────────────────────────────────────┘
                                    ▼
┌─────────────────────────────────────────────────────────────────────────────┐
│ Receive the downlink data from the second base station while the UE is in   │
│ the RRC_INACTIVE state                                                      │
│                                 1626                                        │
└─────────────────────────────────────────────────────────────────────────────┘
                                    ▼
┌─────────────────────────────────────────────────────────────────────────────┐
│ Send a path switch message to the core network (CN) and operating as an     │
│ anchor node for the UE                                                      │
│                                 1627                                        │
└─────────────────────────────────────────────────────────────────────────────┘
                                    ▼
┌─────────────────────────────────────────────────────────────────────────────┐
│                     Transmit the downlink data to the UE                    │
│                                 1628                                        │
└─────────────────────────────────────────────────────────────────────────────┘
                                    ▼
┌─────────────────────────────────────────────────────────────────────────────┐
│ Receive additional uplink data transmitted by the UE while the UE is in the │
│ RRC_INACTIVE state and forward the additional user plane uplink data to     │
│ the CN, and/or receive user plane downlink data for the UE from the CN      │
│ while the UE is in the RRC_INACTIVE state and transmit the user plane       │
│ downlink to the UE                                                          │
│                                 1629                                        │
└─────────────────────────────────────────────────────────────────────────────┘
```

FIG. 16B

CONTEXT FETCH PROCEDURE FOR INACTIVE DIRECT DATA TRANSMISSION

RELATED APPLICATIONS

The present application is the national phase of International Application No. PCT/CN2020/117809, filed on Sep. 5, 2020 and the disclosure of which is hereby incorporated herein by reference in its entirety.

FIELD OF INVENTION

Embodiments of invention relate generally to wireless technology and more particularly to handling direct data transmission with user equipment (UE) when in an inactive state.

BACKGROUND

In 5G New Radio (NR), a user equipment (UE) can be in one of three states: CONNECTED, INACTIVE, and IDLE. The CONNECTED state allows for full data transmission between the UE and a base station (BS) and the core network (CN). The IDLE state is a power saving state where data is not exchanged. The INACTIVE state for a UE is a suspend state that allows for the UE to return to the CONNECTED state more quickly than if the UE is in the IDLE state.

In 5G NR, in order for a UE to transition to the CONNECTED state in order to allow for full data transmission, the UE would perform a Radio Resource Control (RRC) Resume procedure. The RRC Resume procedure takes time to complete. Thus, there is a delay that is necessary to complete the RRC Resume procedure between the time data for transfer arrives until the data can be transmitted. Normally, such a delay is not considered problematic when the UE is going to be involved in transferring a large amount of data. However, if the amount of data is small, such that a UE would quickly return to an inactive state soon after performing the smaller data transfer, then the delay in completing the RRC Resume procedure may be considered unreasonable.

Recently, 5G NR specified that a UE can transfer smaller amounts of data while in the inactive state. This is advantageous in that it avoids the delay the UE incurs by completing the RRC Resume procedure. However, there is no specification in 5G NR as to how such transfers are to be handled by the network.

SUMMARY OF THE DESCRIPTION

A method and apparatus of a device that communicates data between a user equipment (UE) device and a base station (BS) when the user equipment is in the inactive state (e.g., a Radio Resource Control (RRC) inactive (RRC_INACTIVE) state) is described.

In some embodiments, the last serving base station of the UE and the new base station of the UE coordinate with each other to complete the transfer of data while the UE is in the inactive state. In some embodiments, a last serving base station both a message requesting UE context and user plane uplink data from a new base station of the UE, where the user plane uplink data is sent from the UE to the last serving base station while the UE was in the inactive state, and forwards the user plane uplink data to the core network (CN) on behalf of the UE.

In some embodiments, a new base station for the UE receives user plane uplink data transmitted from a user equipment (UE) while the UE was in the inactive (RRC_INACTIVE) state and sends both a message to the last serving base station to request UE context along with the user plane uplink data, so that the last serving base station can forward the data to the CN.

In some embodiments, the last serving base station sending a message to the UE to configure the UE in the inactive state and sends the UE context to one or more other base stations that can potentially act as the new base station for the UE. This facilitates the transfer of responsibility from the last serving base station to a new base station to enable completion of the data transfer with the UE while the UE is in an inactive state.

In some embodiments, the new base station receives a UE context that the last serving base station sends to one or more other base stations that can potentially act as the new base station for a UE. Thereafter, the new base station receives user plane uplink data transmitted from the UE while the UE was in the inactive state and operates as an anchor node for the UE in response to receiving the user plane uplink data from the UE.

Other methods and apparatuses are also described.

BRIEF DESCRIPTION OF THE DRAWINGS

The present invention is illustrated by way of example and not limitation in the figures of the accompanying drawings in which like references indicate similar elements.

FIG. 11B is a flow diagram of one embodiment of a process performed by a new gNB for handling a user plane uplink data sent from a UE while the UE is in the RRC_INACTIVE state.

FIG. 13B is a flow diagram of yet another embodiment of a process performed by a new gNB for handling a user plane uplink data sent from a UE while the UE is in the RRC_INACTIVE state.

FIG. 16B is a flow diagram of another embodiment of a process for handling new downlink data from the CN that is sent to the last serving gNB prior to the UE sending data to the new gNB while the UE is in the RRC_INACTIVE state.

DETAILED DESCRIPTION

Figure 1:
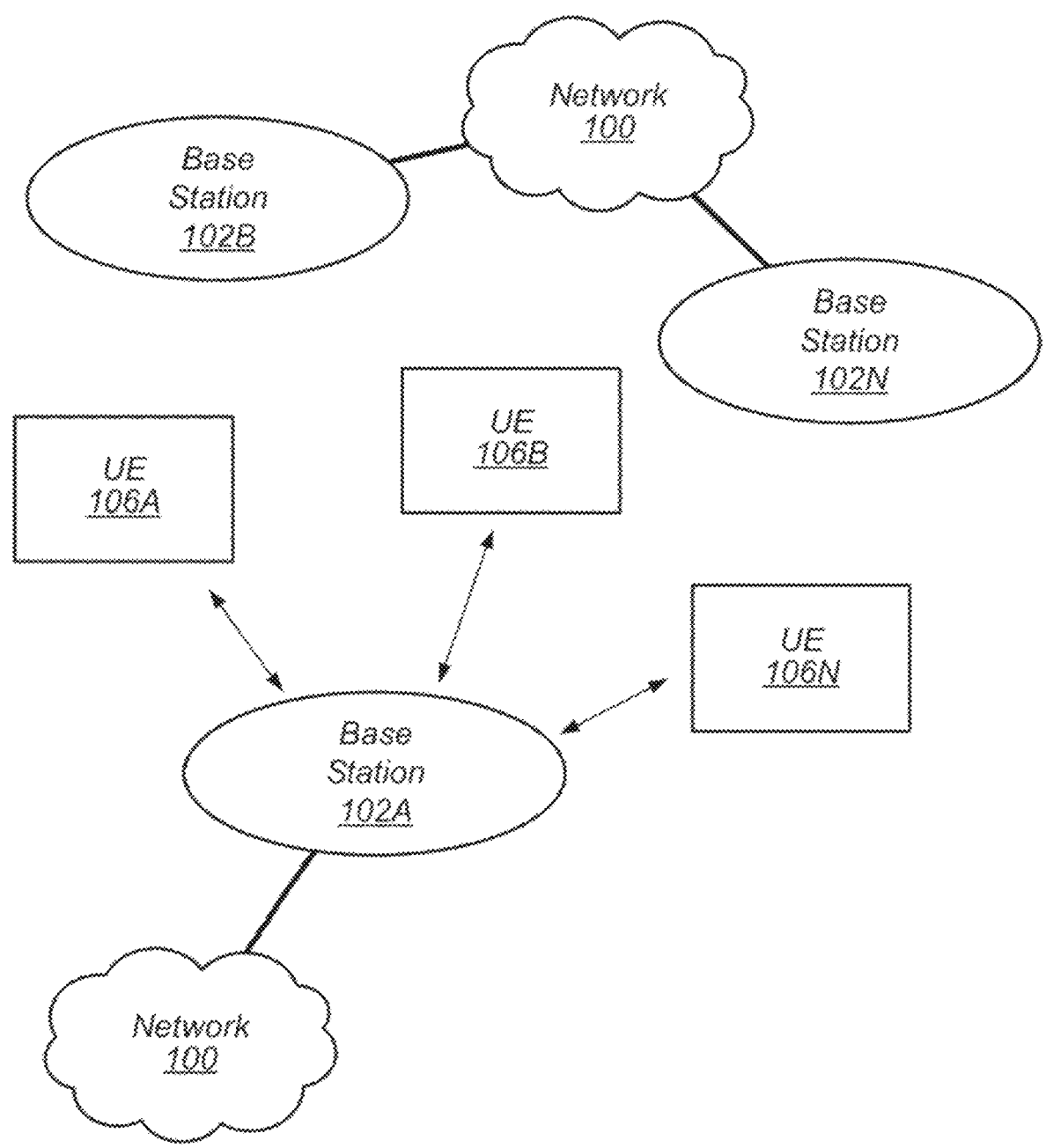
FIG. 1 illustrates an example wireless communication system according to some embodiments.

A method and apparatus of a device that communicates data between a user equipment (UE) device and a base station when the user equipment is in the inactive state is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that communicates data between a user equipment (UE) device and a base station (BS) when the user equipment is in the inactive state (e.g., a Radio Resource Control (RRC) inactive (RRC_INACTIVE) state) is described. In some embodiments, the last serving base station of the UE and the new base station of the UE coordinate with each other to complete the transfer of data while the UE is in the inactive state. For example, in some embodiments, a last serving base station both a message requesting UE context and user plane uplink data from a new base station of the UE, where the user plane uplink data is sent from the UE to the last serving base station while the UE was in the inactive state, and forwards the user plane uplink data to the core network (CN) on behalf of the UE.

As another example, a new base station for the UE receives user plane uplink data transmitted from a user equipment (UE) while the UE was in the inactive (RRC_INACTIVE) state and sends both a message to the last serving base station to request UE context along with the user plane uplink data, so that the last serving base station can forward the data to the CN.

In yet another example, the last serving base station sending a message to the UE to configure the UE in the inactive state and sends the UE context to one or more other base stations that can potentially act as the new base station for the UE. This facilitates the transfer of responsibility from the last serving base station to a new base station to enable completion of the data transfer with the UE while the UE is in an inactive state.

In still yet another example, the new base station receives a UE context that the last serving base station sends to one or more other base stations that can potentially act as the new base station for a UE. Thereafter, the new base station receives user plane uplink data transmitted from the UE while the UE was in the inactive state and operates as an anchor node for the UE in response to receiving the user plane uplink data from the UE.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
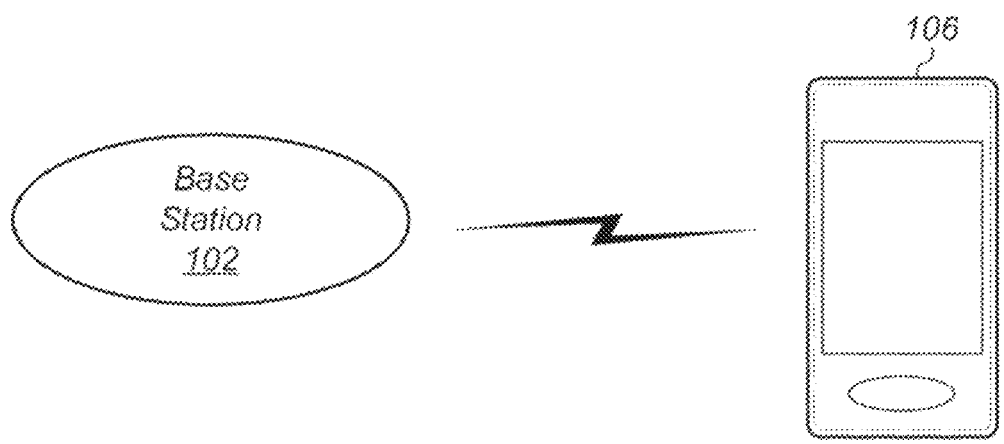
FIG. 2 illustrates a base station (BS) in communication with a user equipment (UE) device according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 3:
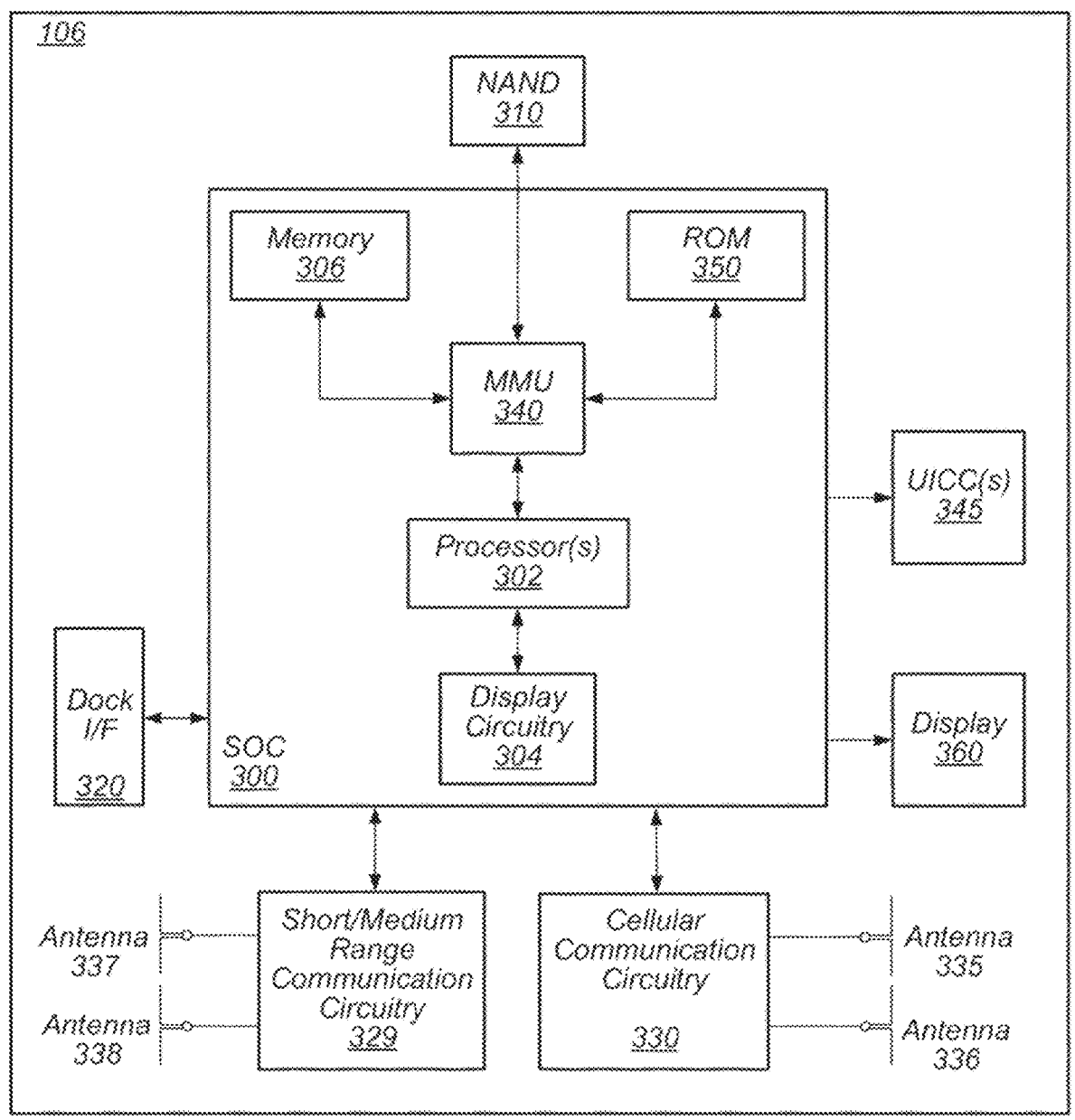
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to enter and exit an inactive state (e.g., RRC_INACTIVE state) and transfer data with the rest of the communication network while in the inactive state. In some embodiments, such transfers may involve user plane uplink data and/or user plane downlink data and are facilitated by the last serving base station and a new base station.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
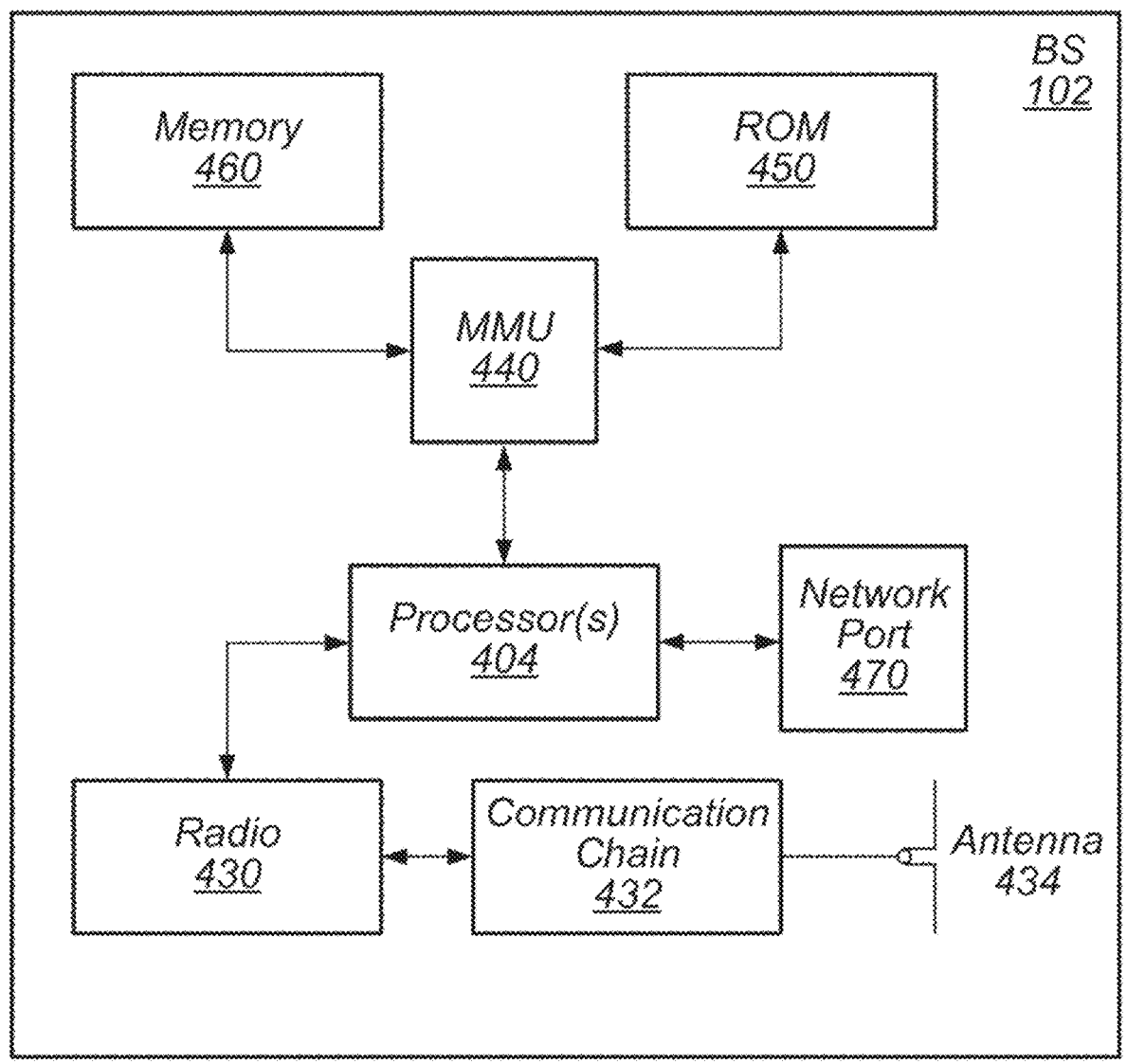
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
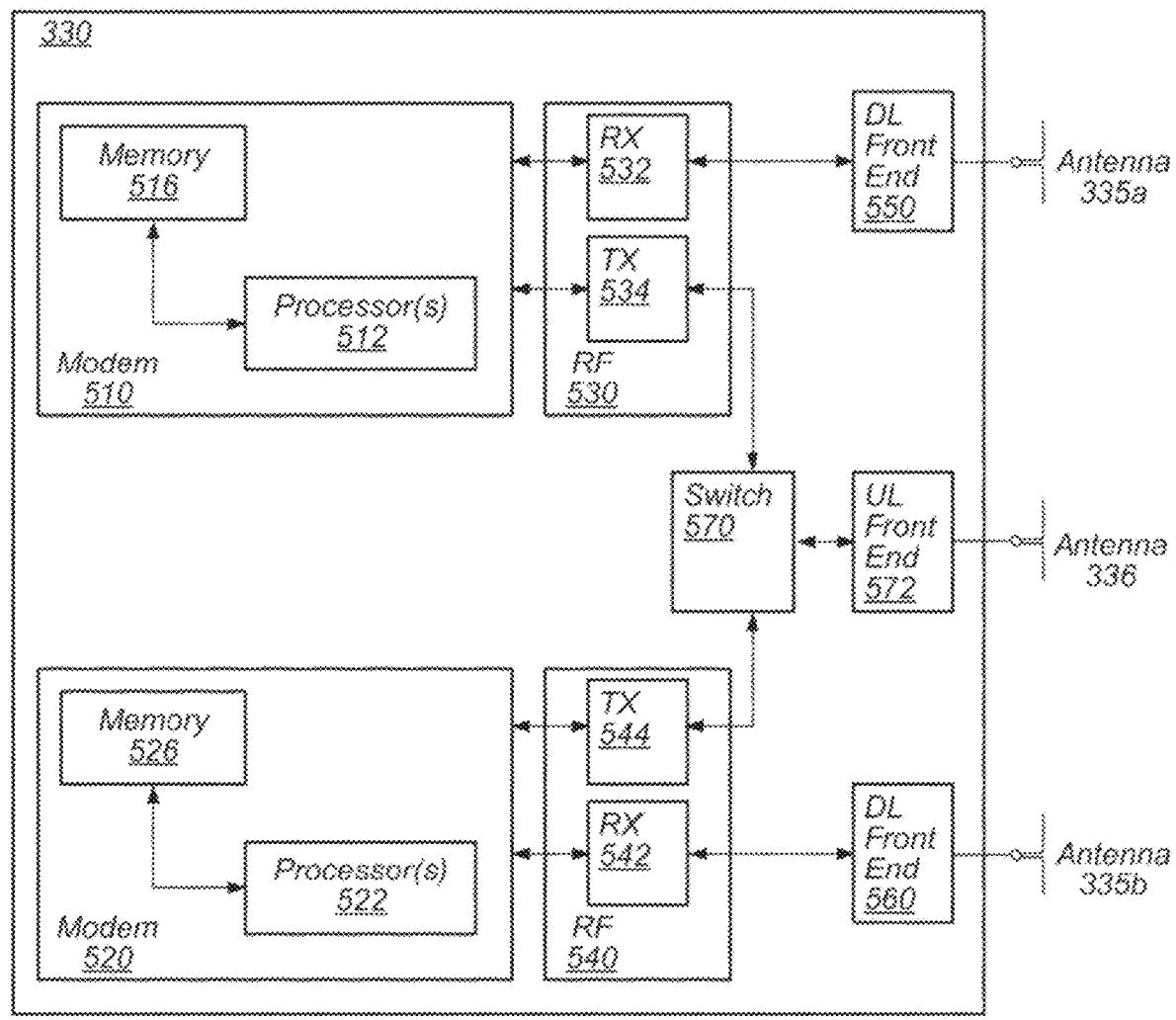
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for switching a bandwidth part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for switching bandwidth parts on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

As described above, in 5G New Radio (NR), a user equipment (UE) can be in one of three states: CONNECTED, INACTIVE, and IDLE. The CONNECTED state, referred to herein as the RRC_CONNECTED state, allows for full data transmission between the UE and a base station (BS) and the core network (CN). The IDLE stat, referred to herein as the RRC_IDLE state, is a power saving state where data is not exchanged. The INACTIVE state, referred to herein as the RRC_INACTIVE state, for a UE is a suspend state that allows for the UE to return to the CONNECTED state more quickly than if the UE is in the IDLE state. In some embodiments, for the UE in the inactive state, a UE control plane has a Non-Access Stratum (NAS) connection to the core network (CN). In addition, the UE does not have a dedicated Access Stratum (AS) resource and the UE keeps the Radio Resource Control (RRC) configuration before the UE enters INACTIVE state. Furthermore, in the INACTIVE state in the legacy procedure, the UE cannot perform any dedicated data transmission/reception, and if the UE has a dedicated data transmission/reception, then UE enters CONNECTED state. For DL data transmission, gNodeB pages the UE via RAN-paging mechanism to trigger UE to enter the CONNECTED state. For UL data transmission, the UE will trigger a RACH procedure to enter CONNECTED state. In a further embodiment, a UE in the INACTIVE state can move within a RNA (e.g., a RAN notification area) without notifying Next Generation-Radio Access Network (NG-RAN). In addition, in this state, the UE in the INACTIVE state can have the cell selection/reselection the same as a UE in the RRC_IDLE state.

As discussed above, the UE can transition between the different states. For example, a state transition between INACTIVE and CONNECTED states occurs with a RRC Control message. For example, when transitioning from the CONNECTED state to the INACTIVE state, a RRC Release with SuspendConfig procedure is used, and when transitioning from the INACTIVE state to the CONNECTED state, a RRC Resume procedure is used. When transitioning between the INACTIVE state and the IDLE state, a RRC Release procedure may be used.

Figure 6:
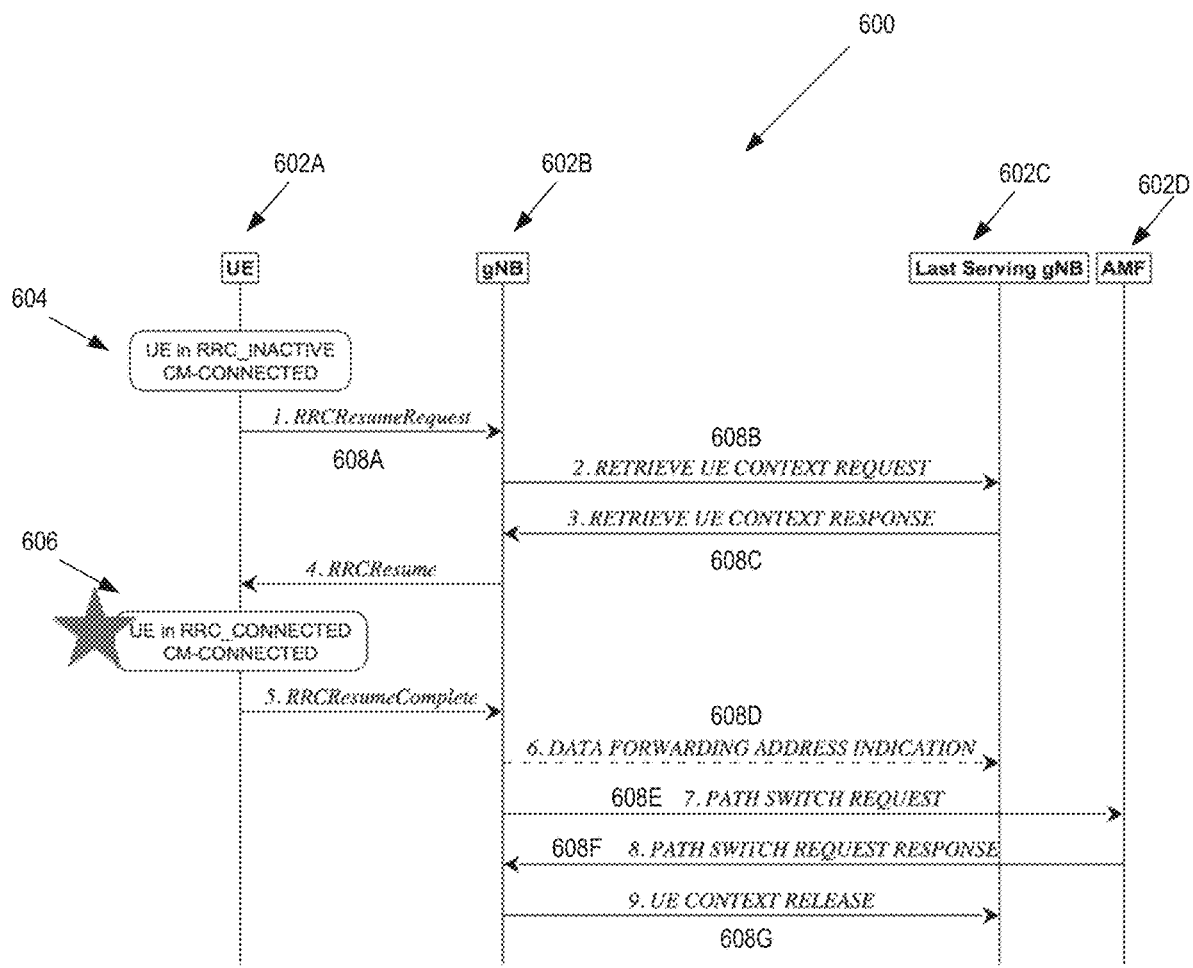
FIG. 6 is an illustration of some embodiments of a UE switch from an inactive state to a connected state.

FIG. 6 is an illustration of some embodiments of a UE 600 switching from an RRC_INACTIVE state to the CONNECTED state using a legacy procedure. In legacy procedure, when the UE 604 is in an RRC_INACTIVE state and wants to transition to the RRC_CONNECTED state, UE 604 sends a RRCResumeRequest 608A to a new gNB 602B. In response to RRCResumeRequest 608A, the new gNB 602B find the last serving gNB 602C via the UE's I-RNTI, and triggers a UE context fetch procedure in which the new gNB 602C sends a RETRIEVE UE CONTEXT REQUEST message to last serving gNB 602C. The new gNB 602B forwards the MAC-I to the last serving gNB 602C for security checking. If the last serving gNB 602C checks the MAC-I successfully, then the last serving gNB 602C provides the UE context to the new gNB 602B via a RETRIEVE UE CONTEXT RESPONSE message 608C, and the new gNB 602B decides the target gNB's configuration and sends the RRCResume message to UE 604. As this point, the UE is in the RRC_CONNECTED state.

Once in the RRC_CONNECTED state, UE 604 sends a RRCResumeComplete message to the new GNB 602B. Upon receives the RRCResumeComplete message, the new gNB 602B trigger the path switch change procedure to the network (NW) (e.g., data forwarding address indication 608D and path switch request 608E) and relocates the UE's anchor node. Otherwise, the UE context fetch procedure fails, and the new gNB 602B send RRCReject or RRCSetup message to UE 604. If data transmission is supported in RRC_INACTIVE state, especially to support the subsequent transmission, the NW behavior for the data transmission to/from core network (CN) needs to be specified.

Figure 7B:
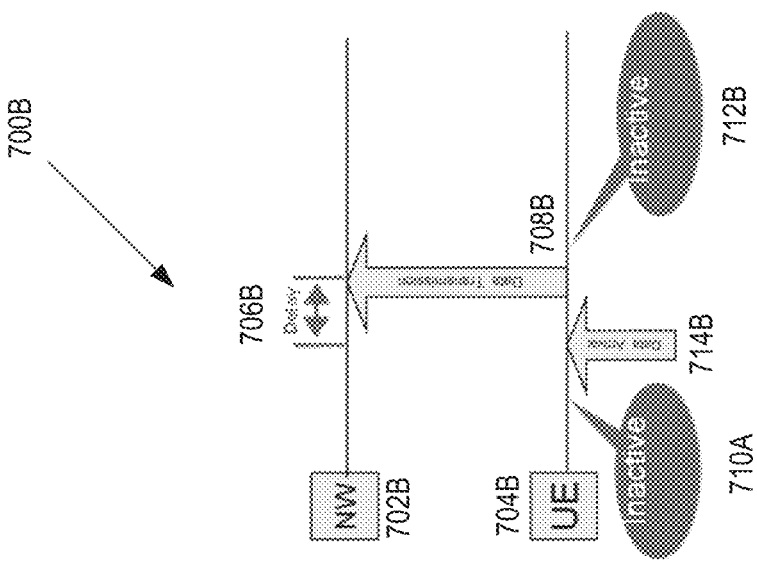
FIG. 7B is an illustration of some embodiments of a is timeline of UE to communicate data in an inactive state.
Figure 7A:
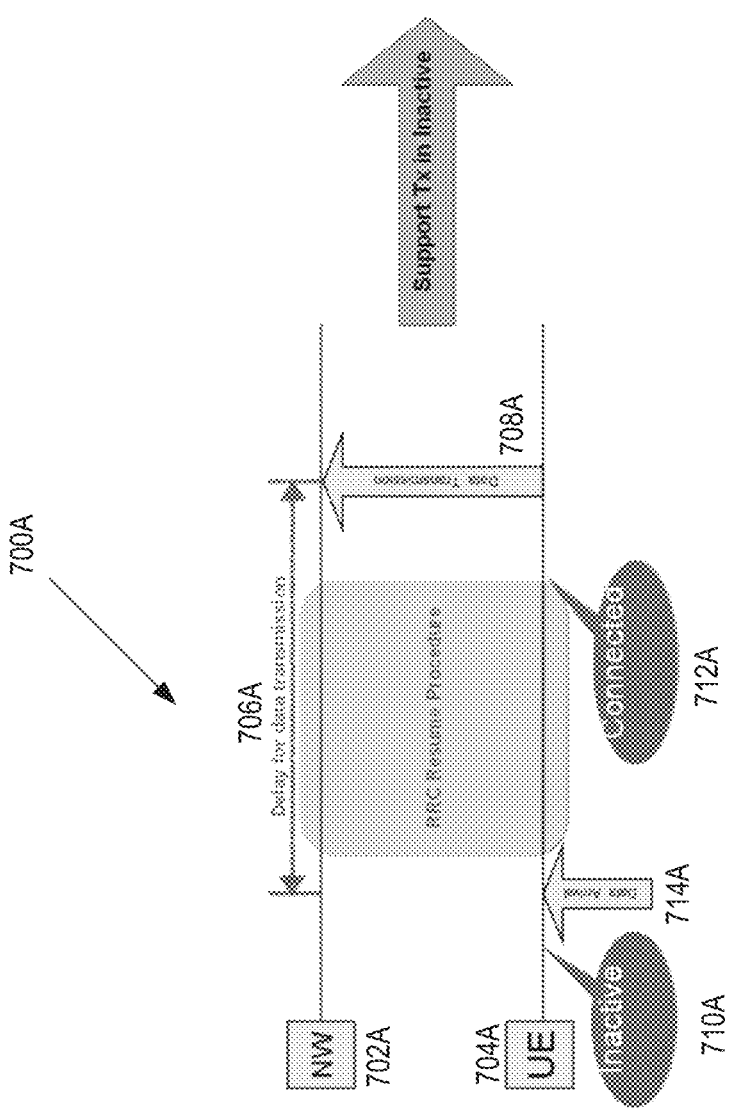
FIG. 7A is an illustration of some embodiments of a is timeline of UE switch from an inactive state to a connected state.

In some embodiments, even though the transition from INACTIVE to a CONNECTED state takes less time that a transition from an IDLE to a CONNECTED state, the INACTIVE to a CONNECTED state transitions may not idea for many types of data transmissions involving small packet transmissions. In some embodiments, if the UE receives or transmits small data transmissions, the amount of time used to transition from INACTIVE to the CONNECTED state can be large as compared to the time used for the data transmission. If there a number of small data transmissions, or a recurring small data transmissions, repeatedly transitioning from INACTIVE to CONNECTED states can be inefficient. FIG. 7A is an illustration of a timeline of a UE switching from an INACTIVE state to a CONNECTED state. Referring to FIG. 7A, the UE 704A is in an INACTIVE state 710A and receives an indication of a data arrival 714A. The delay for the data transmission 706A is the delay used in order to transition the UE 704A to the CONNECTED state 712A using the RRC Resume procedure as described above. Once this procedure is completed, the UE 704A is in the CONNECTED state 712A and can proceed with the data transmission 708A to the network 702A. For small data transmissions, such as a user application keep alive message, an application notification, or other small data transmission to the user plane of the UE 704A, the amount of time to get the UE704A into the CONNECTED state 712A is large in comparison to the time used for the data transmission. Thus, the amount of overhead used for the data transmission is large in comparison to the overall amount of time used for the data transmission. In some embodiments described herein, the time by which such data transmission occur is reduced.

More specifically, in some embodiments, by allowing data transmissions while the UE is in the INACTIVE state, the overhead used to transition the UE from the INACTIVE to CONNECTED state is no longer needed. FIG. 7B is an illustration of a timeline associated with a UE being able to communicate data in an INACTIVE state in accordance with some embodiments. Referring to FIG. 7B, the UE 704B is in the INACTIVE state 710B when the UE 704B receives an indication of data arrival 714B. Instead of starting a transition to a CONNECTED state, UE, in cooperation with one or more gNBs can perform one or more operations that allow the UE 714B to communicate the data transmission (e.g., either transmit or receive the data transmission) while in the INACTIVE state (710B or 712B). In some embodiments, these operations can have a significantly smaller delay 706B, which allows the data transmission to occur in a shorted time than with the legacy procedure depicted in FIG. 7A. The different types of operations are described further below.

In some embodiments, the UE transmits data while in the INACTIVE state by having the last serving gNB remain as an anchor node and having the last serving gNB receive or transmit the UE data to or from the CN. For an uplink transmission, when the new gNB receives the data from the UE, the new gNB forwards the data to last serving gNB for forwarding on to the CN. For a downlink transmission, when last serving gNB receives the UE's data from the CN, the last serving gNB forwards the data to the new gNB and the new gNB transmits to the data to UE. For each of these transmissions, the UE remains in the INACTIVE state.

Figure 8:
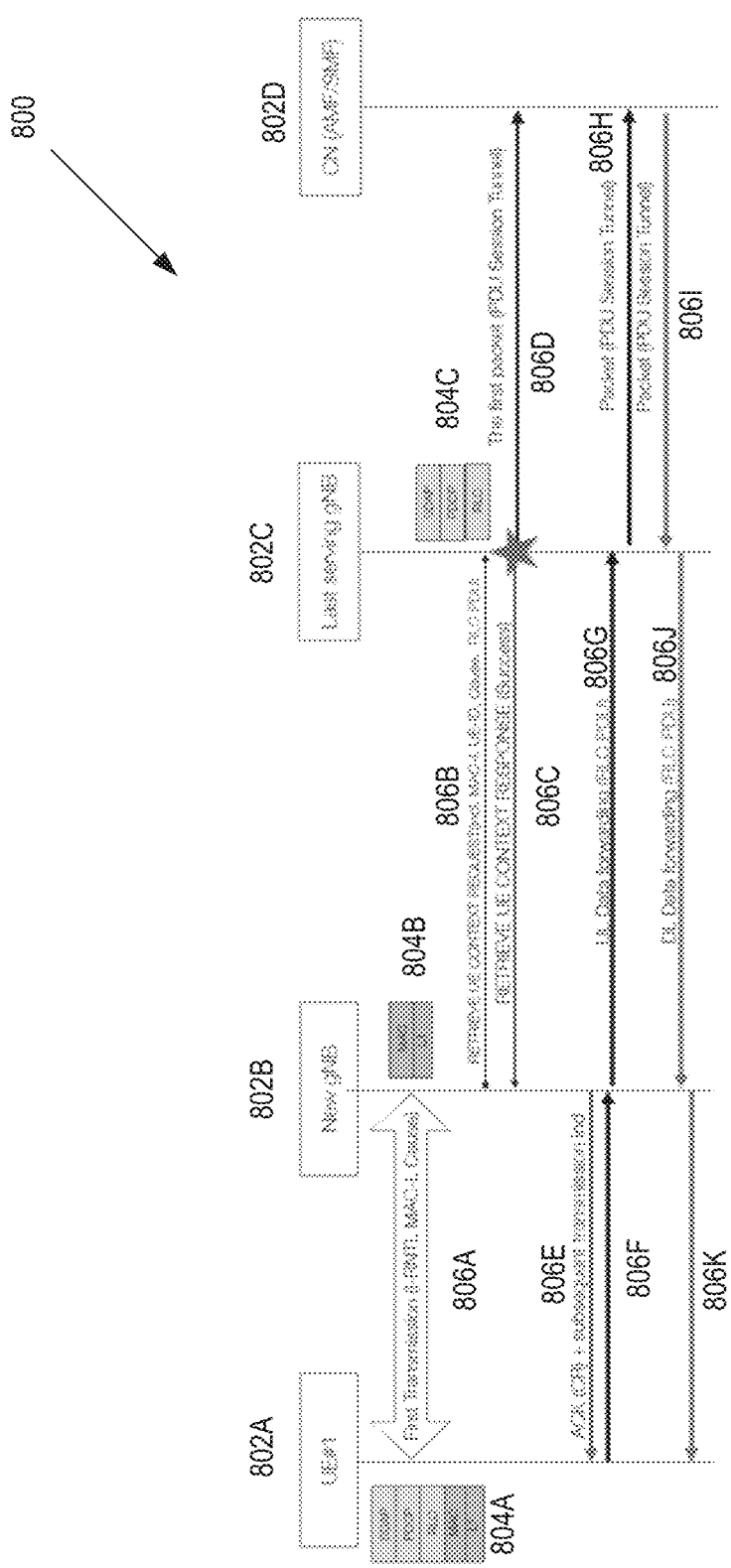
FIG. 8 is an illustration of some embodiments of communicating data with a UE in the inactive state and the last served gNodeB (gNB) remains the anchor node.

FIG. 8 is an illustration of some embodiments of communicating data with a UE in the INACTIVE state where the last serving gNB remains the anchor node. In some embodiments, for user plane data handling, the L2 protocol stack is split between the new gNB (MAC) and old gNB (RLC, PDCP, SDAP). For a data transfer in the uplink direction, the new gNB derives the DRB's RLC PDU from the received MAC PDU and forwards it to the last serving gNB via the Xn interface. In some embodiments, for the uplink data in the first packet, the new gNB piggybacks the RLC PDU in the container of the UE context request message. Alternatively, the RLC PDU can be sent together with the UE context request message. After receiving the uplink data, the last serving gNB performs the RLC/PDCP/SDAP operation to decode the received RLC PDU and forwards the upper data (e.g., SDAP SDU) to CN User Plane Function (UPF).

In some embodiments, for a data transfer in the downlink (DL) direction (for both the first and subsequent DL transmissions), the CN/UPF delivers the packet to the last serving gNB, which performs SDAP/PDCP/RLC handling and assembles the data into RLC PDU. The last serving gNB then forwards the RLC PDU to the new gNB, which performs the MAC and L1 handling and transmits the data to UE via Uu interface.

Referring to FIG. 8, a first transmission 806A from the UE 802A to gNB 802B occurs while in the INACTIVE state and includes user plane uplink data. In response, gNB 802B sends a UE context request message, RETRIEVE CONTEXT REQUEST message 806B, with the user plane uplink data, to last serving gNB 802C. In some embodiments, the user plane uplink data is contained in the UE context request message. In another embodiment, the user plane uplink data is sent with the UE context request message but is not contained within it. In some embodiments, the user plane uplink data is send as RLC PDU.

In response to UE context request message and the user plane uplink data, the last serving gNB 802C forwards the user plane uplink data to the CN 802D. In some embodiments, the last serving gNB 802C forwards the upper layer (e.g., SDAP SDU) to the CN 802D. In this manner the first packet is transferred using a PDU Session Tunnel.

In response to UE context request message and the user plane uplink data, the last serving gNB 802C also sends a message back to the new gNB 802B with the UE context, for which the new gNB 802B sends an acknowledgement (ACK) regarding the data transfer. In some embodiments, the message is a RETRIEVE CONTEXT RESPONSE message.

Thereafter, both uplink and downlink data transmission by the UE while in the INACTIVE state occurs with the CN via new gNB 802B, including handling the user plane data transferred between the new NB 802B and the last serving gNB 802C (e.g., UL data 806G, DL data 806J) being RLC PDU and the data transferred between the last serving gNB 802C and the CN (e.g., UL data 806H, DL data 806I) via a PDU Session Tunnel.

In another embodiment, the anchor node is relocated from the last serving gNB to the new access gNB. Upon receiving the first data transmission from the UE while in the INACTIVE state, the new gNB performs a UE context fetch procedure and acquires the UE context from the last serving gNB. The new gNB also sends a data forwarding address indication (e.g., an Xn-U Address Indication) and performs the path switch to the CN. At this point, the UE's anchor gNB is updated to the new access gNB from CN point of view, and the UE's data transmission to/from the CN is via the new access gNB.

Figure 9:
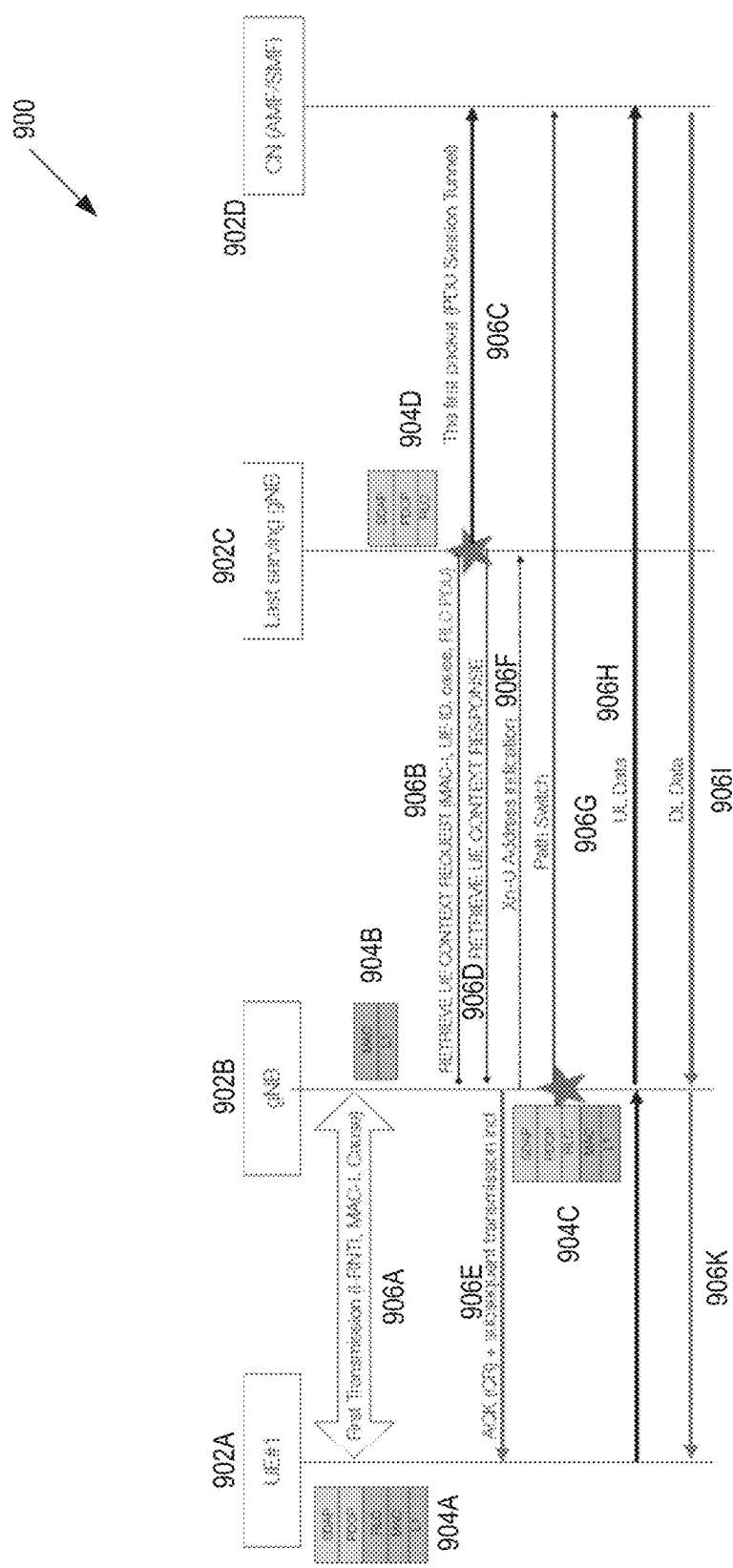
FIG. 9 is an illustration of some embodiments of communicating data with a UE in the inactive state and the new gNB becomes the anchor node.

FIG. 9 is an illustration of some embodiments of communicating data with a UE in the inactive state and the new gNB becomes the anchor node. For the first packet transmission, the procedure is similar as described in FIG. 8 above, including the same protocol stack split. Referring to FIG. 9, a first transmission 906A from the UE 902A to gNB 902B occurs while in the INACTIVE state and includes user plane uplink data. In response, gNB 902B sends a UE context request message, RETRIEVE CONTEXT REQUEST message 906B, with the user plane uplink data, to last serving gNB 902C. In some embodiments, the user plane uplink data is contained in the UE context request message. In another embodiment, the user plane uplink data is sent with the UE context request message but is not contained within it. In some embodiments, the user plane uplink data is send as RLC PDU.

In response to UE context request message and the user plane uplink data, the last serving gNB 902C forwards the user plane uplink data to the CN 902D. In some embodiments, the last serving gNB 902C forwards the upper layer (e.g., SDAP SDU) to the CN 902D. In this manner the first packet is transferred using a PDU Session Tunnel.

In response to UE context request message and the user plane uplink data, the last serving gNB 902C also sends a message back to the new gNB 902B with the UE context, for which the new gNB 902B sends an acknowledgement (ACK) regarding the data transfer. In some embodiments, the message is a RETRIEVE CONTEXT RESPONSE message.

After receiving the UE context information, the new gNB 902B sends a data forwarding indication (e.g., Xn-U Address Indication 906F) to the last serving gNB 902C and a Path Switch message 906G to CN 902D. After this occurs, the anchor node is relocated from the last serving gNB 902C to the new gNB 902B.

For the subsequent transmission, after anchor node relocation, all the data transmission/reception will be handled by new gNB 902B directly. For example, user plane UL data from UE 902A is transmitted to gNB 902B, which forwards the UL data 906H to CN 902D, while user plane DL data from CN 902D is transmitted to gNB 902B, which forwards the DL data 906I to UE 902A.

Figure 10:
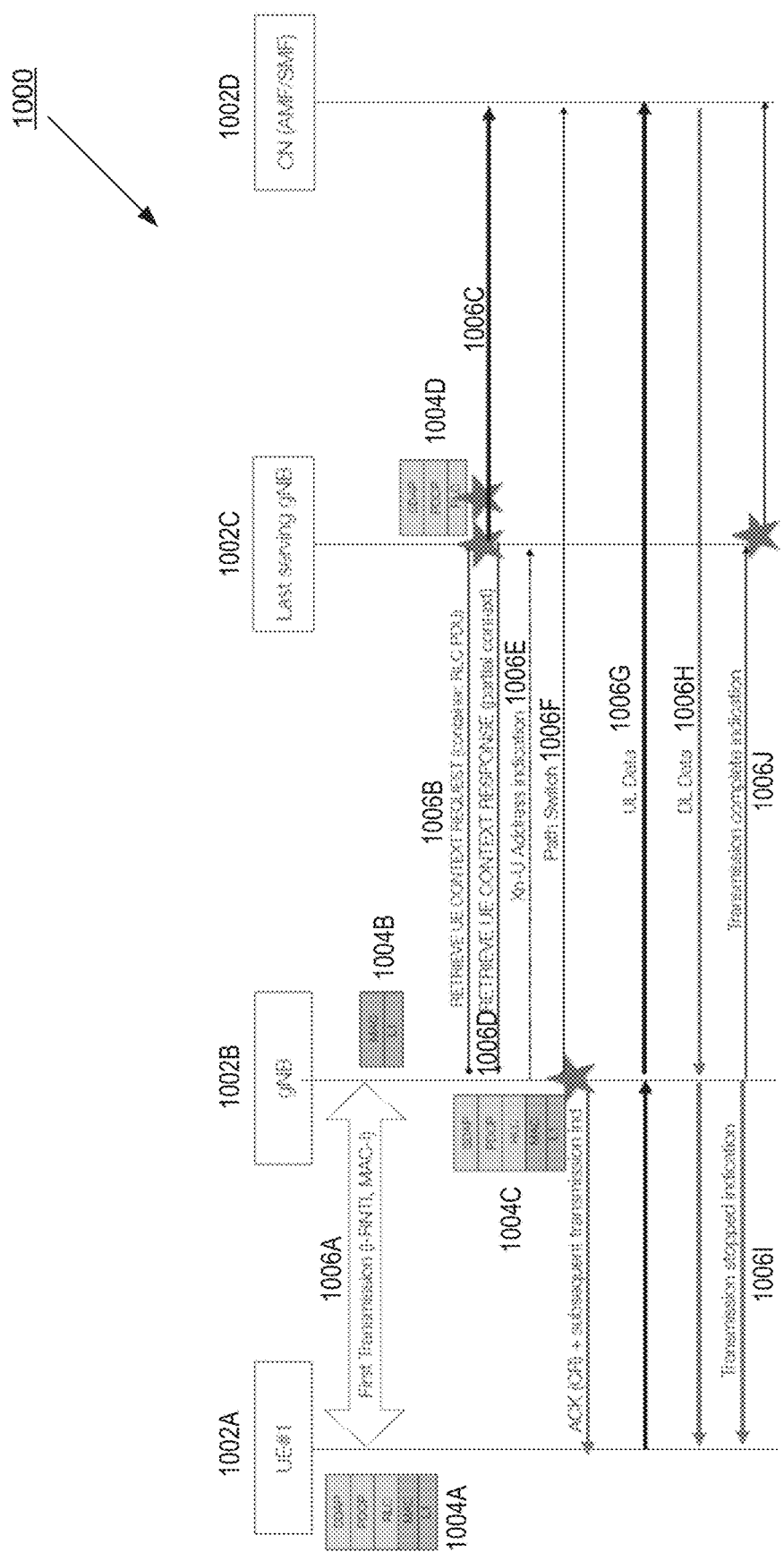
FIG. 10 is an illustration of some embodiments of communicating data with a UE in the inactive state and the new gNB temporarily becomes the anchor node.

In a further embodiment, the new gNB is temporarily assigned as the anchor node for the UE and releases the anchor node responsibility to the last serving gNB after the transmission has completed. FIG. 10 is an illustration of some embodiments of communicating data with a UE in the INACTIVE state where the new gNB temporarily becomes the anchor node. In some embodiments, the anchor node is in last serving gNB, but forwards the UE context to a new gNB for temporary usage. When new gNB connects to the last serving gNB, the last serving gNB will provides the INACTIVE SMT related UE context (the UE configured for data transmission while in the INACTIVE state) to the new gNB, and performs the temporary path switch to the CN. After the SMT transmission has finished, the new gNB deletes the UE's context and the temporary path to CN. In this case, the UE's data transmission to/from the CN is via the new access gNB.

Referring to FIG. 10, for the first packet transmission, the procedure is similar as described in FIG. 8 above, including the same protocol stack split. Referring to FIG. 10, a first transmission 1006A from the UE 1002A to gNB 1002B occurs while in the INACTIVE state and includes user plane uplink data. In response, gNB 1002B sends a UE context request message, RETRIEVE CONTEXT REQUEST message 1006B, with the user plane uplink data, to last serving gNB 1002C. In some embodiments, the user plane uplink data is contained in the UE context request message. In another embodiment, the user plane uplink data is sent with the UE context request message but is not contained within it. In some embodiments, the user plane uplink data is send as RLC PDU.

In response to UE context request message and the user plane uplink data, the last serving gNB 1002C forwards the user plane uplink data to the CN 1002D. In some embodiments, the last serving gNB 1002C forwards the upper layer (e.g., SDAP SDU) to the CN 1002D. In this manner the first packet is transferred using a PDU Session Tunnel.

In response to UE context request message and the user plane uplink data, the last serving gNB 1002C also sends a message back to the new gNB 1002B with partial UE context, for which the new gNB 1002B sends an acknowledgement (ACK) regarding the data transfer. In some embodiments, the message is a RETRIEVE CONTEXT RESPONSE message.

After receiving the UE context information, the new gNB 1002B sends a data forwarding indication (e.g., Xn-U Address Indication 1006E) to the last serving gNB 1002C and a Path Switch message 1006F to CN 1002D. After this occurs, the anchor node is temporality relocated from the last serving gNB 1002C to the new gNB 1002B.

For the subsequent transmission, after temporary anchor node relocation, all the data transmission/reception will be handled by new gNB 1002B directly. For example, user plane UL data from UE 1002A is transmitted to gNB 1002B, which forwards the UL data 1006G to CN 1002D, while user plane DL data from CN 1002D is transmitted to gNB 1002B, which forwards the DL data 1006H to UE 1002A.

Figure 11A:
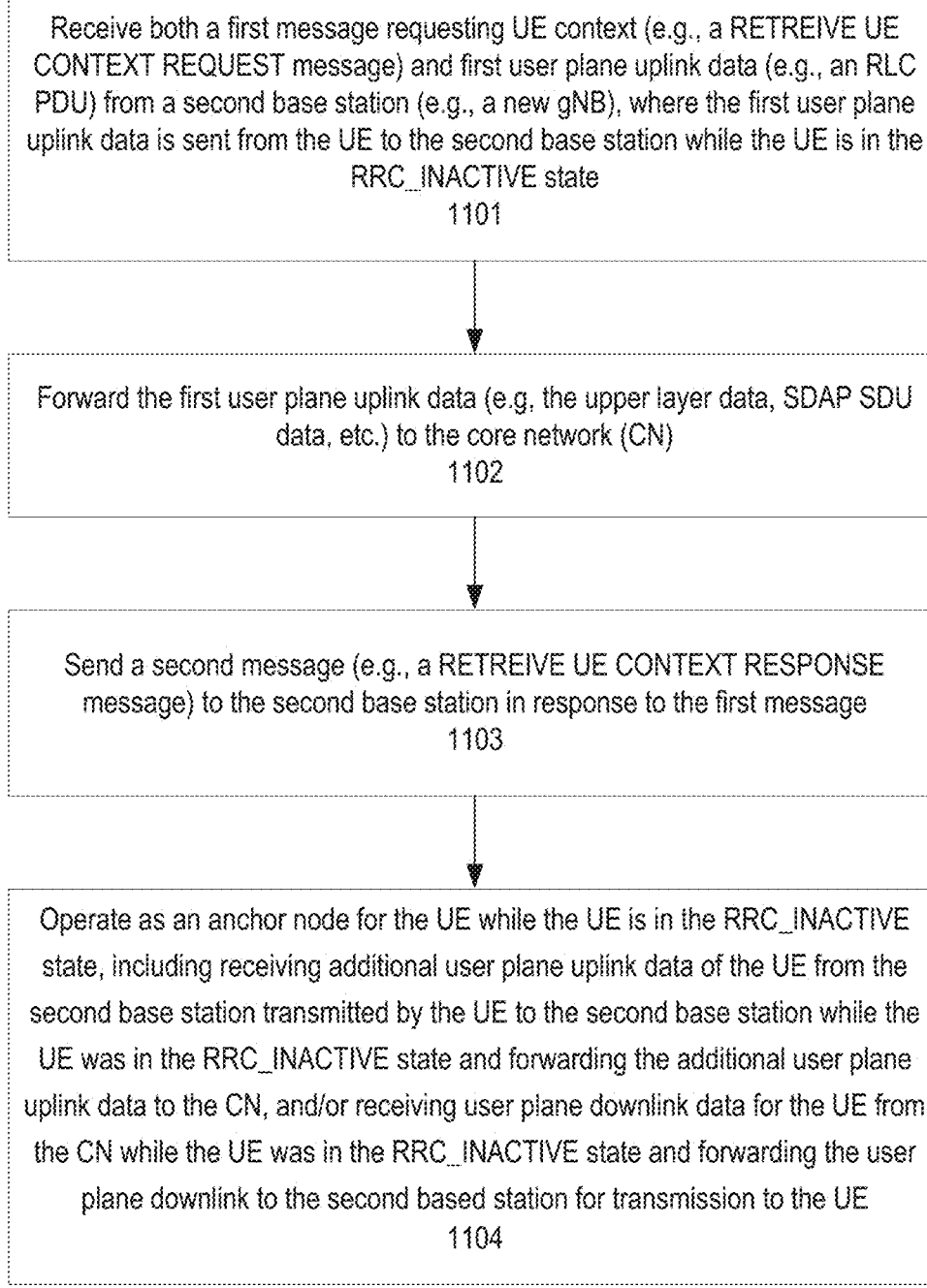
FIG. 11A is a flow diagram of one embodiment of a process performed by a last serving gNB for handling a user plane uplink data sent from a UE while the UE is in the RRC_INACTIVE state.

FIG. 11A is a flow diagram of one embodiment of a process performed by a last serving gNB for handling a user plane uplink data sent from a UE while the UE is in the Radio Resource Control (RRC) inactive (RRC_INACTIVE) state. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by last serving gNB 802C of FIG. 8.

Referring to FIG. 11A, the process begins by processing logic receiving both a first message requesting UE context and first user plane uplink data from a second base station (e.g., a new gNB), where the first user plane uplink data is sent from the UE to the second base station while the UE is in the RRC_INACTIVE state (processing block 1101). In some embodiments, the first message is a RETRIEVE UE CONTEXT REQUEST message. In some embodiments, the first user plane uplink data is sent as part of the message requesting UE context (e.g., carried in the same container). In another embodiment, the first user plane uplink data is sent together with the message requesting UE context. In some embodiments, the first user plane uplink data is sent as an RLC PDU.

In response to receiving both first message requesting UE context and first user plane uplink data from a second base station, processing logic forwards the first user plane uplink data to the core network (CN) (processing block 1102). In some embodiments, the first user plane uplink data is sent to the CN as upper layer data (e.g., SDAP SDU data).

Processing logic also sends a second message to the second base station in response to the first message (processing block 1103). In some embodiments, the second message comprises a RETRIEVE UE CONTEXT RESPONSE message.

Thereafter, processing logic continues operating as an anchor node for the UE while the UE is in the RRC_INACTIVE state (processing block 1104). In some embodiments, the processing logic continues operating as an anchor node by receiving additional user plane uplink data of the UE from the second base station transmitted by the UE to the second base station while the UE was in the RRC_INACTIVE state and forwarding the additional user plane uplink data to the CN, and/or receiving user plane downlink data for the UE from the CN while the UE was in the RRC_INACTIVE state and forwarding the user plane downlink to the second based station for transmission to the UE.

FIG. 11B is a flow diagram of one embodiment of a process performed by a new gNB for handling a user plane uplink data sent from a UE while the UE is in the RRC_INACTIVE state. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by new gNB 802B of FIG. 8.

Referring to FIG. 11B, the process begins by processing logic receiving first user plane uplink data transmitted from a user equipment (UE) while the UE was in the RRC_INACTIVE state (processing block 1121). In some embodiments, the first user plane uplink data is sent as part of the message containing the control information. In another embodiment, the first user plane uplink data is sent together with a message containing the control information. In some embodiments, the first user plane uplink data is sent as an RLC PDU.

In some embodiments, processing logic also receives control information transmitted from the UE while the UE was in the RRC_INACTIVE state, along with the first user plane uplink data (processing block 1122). In some embodiments, the control information includes one or more of an RRC message, a UE ID, and MAC-I for security checking and UE identification.

In response to receipt of this information, processing logic sends both a first message to a second base station (e.g., the last serving gNB) to request UE context and the first user plane uplink data, where the first user plane uplink data is for forwarding by the second base station to the core network (CN) (processing block 1123). In some embodiments, the first message is a RETRIEVE UE CONTEXT REQUEST message. In some embodiments, the first user plane uplink data is sent as part of the message requesting UE context (e.g., carried in the same container). In some embodiments, the first user plane uplink data is sent as an RLC PDU.

Subsequently, processing logic receives a second message from the second base station in response to the first message (processing block 1124). In some embodiments, the second message comprises a RETRIEVE UE CONTEXT RESPONSE message.

After forwarding the first user plane uplink data to the second base station, processing logic may receive additional user plane uplink data transmitted from the UE while the UE was in the RRC_INACTIVE state and sends the additional uplink data to the second base station for forwarding to the CN by the second base station (processing block 1125). In some embodiments, the additional user plane uplink data comprise one or more RLC PDUs.

Also after forwarding the first user plane uplink data to the second base station, processing logic may receive user plane downlink data for the UE from the CN via the second base station while the UE was in the RRC_INACTIVE state, and assembles the user plane downlink data from the second base station and transmits the assembled user plane downlink data to the UE as a downlink transmission (processing block 1126). In some embodiments, the user plane downlink data comprise one or more RLC PDUs.

Figure 12A:
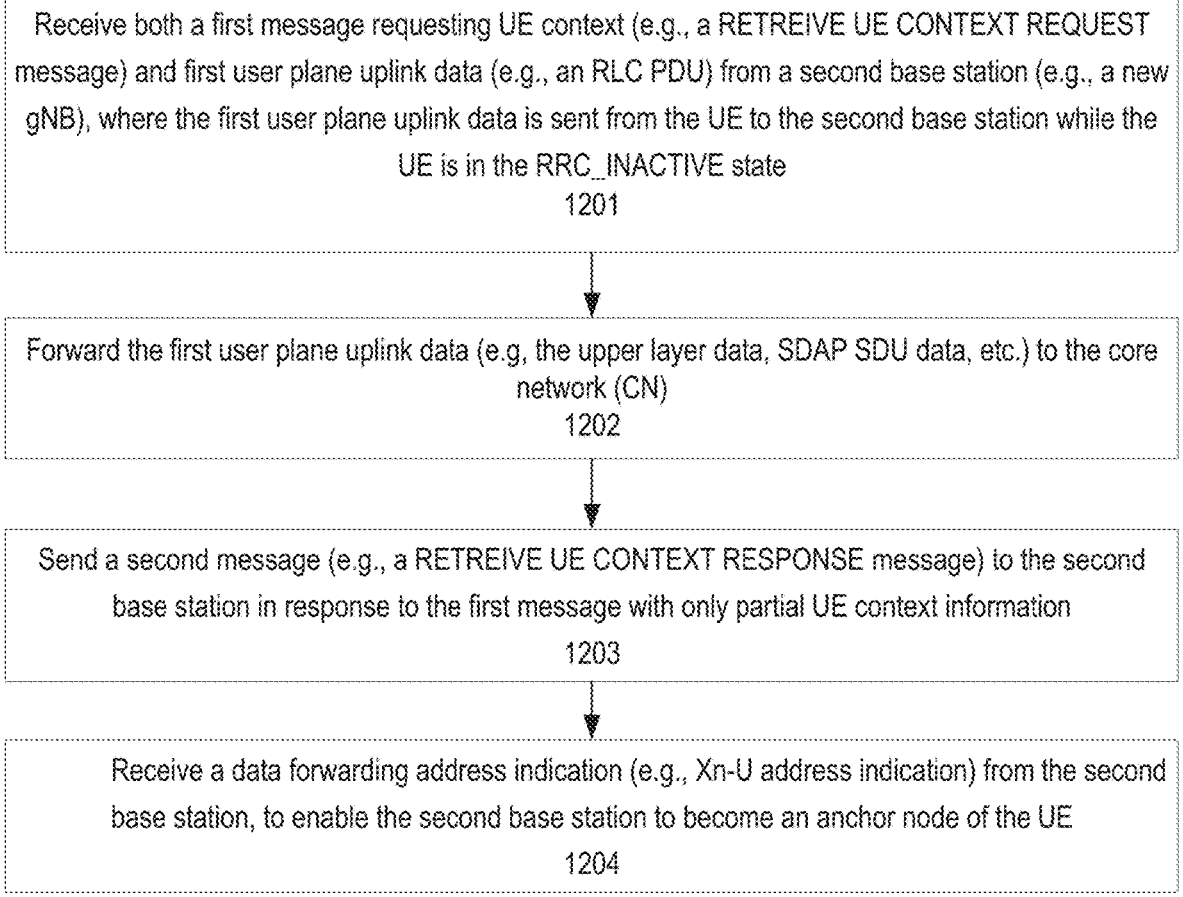
FIG. 12A is a flow diagram of another embodiment of a process performed by a last serving gNB for handling a user plane uplink data sent from a UE while the UE is in the RRC_INACTIVE state.

FIG. 12A is a flow diagram of another embodiment of a process performed by a last serving gNB for handling a user plane uplink data sent from a UE while the UE is in the RRC_INACTIVE state. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by last serving gNB 902C of FIG. 9.

Referring to FIG. 12A, the process begins by processing logic receiving both a first message requesting UE context and first user plane uplink data from a second base station (e.g., a new gNB), where the first user plane uplink data is sent from the UE to the second base station while the UE is in the RRC_INACTIVE state (processing block 1201). In some embodiments, the first message is a RETRIEVE UE CONTEXT REQUEST message. In some embodiments, the first user plane uplink data is sent as part of the message requesting UE context (e.g., carried in the same container). In another embodiment, the first user plane uplink data is sent together with the message requesting UE context. In some embodiments, the first user plane uplink data is sent as an RLC PDU.

Processing logic forwards the first user plane uplink data to the core network (CN) (processing block 1202). In some embodiments, the first user plane uplink data is sent to the CN as upper layer data (e.g., SDAP SDU data).

Processing logic also sends a second message to the second base station in response to the first message (processing block 1203) and receives a data forwarding address indication (e.g., Xn-U address indication) from the second base station, to enable the second base station to become an anchor node of the UE (processing block 1204). In some embodiments, the second message comprises a RETRIEVE UE CONTEXT RESPONSE message.

Figure 12B:
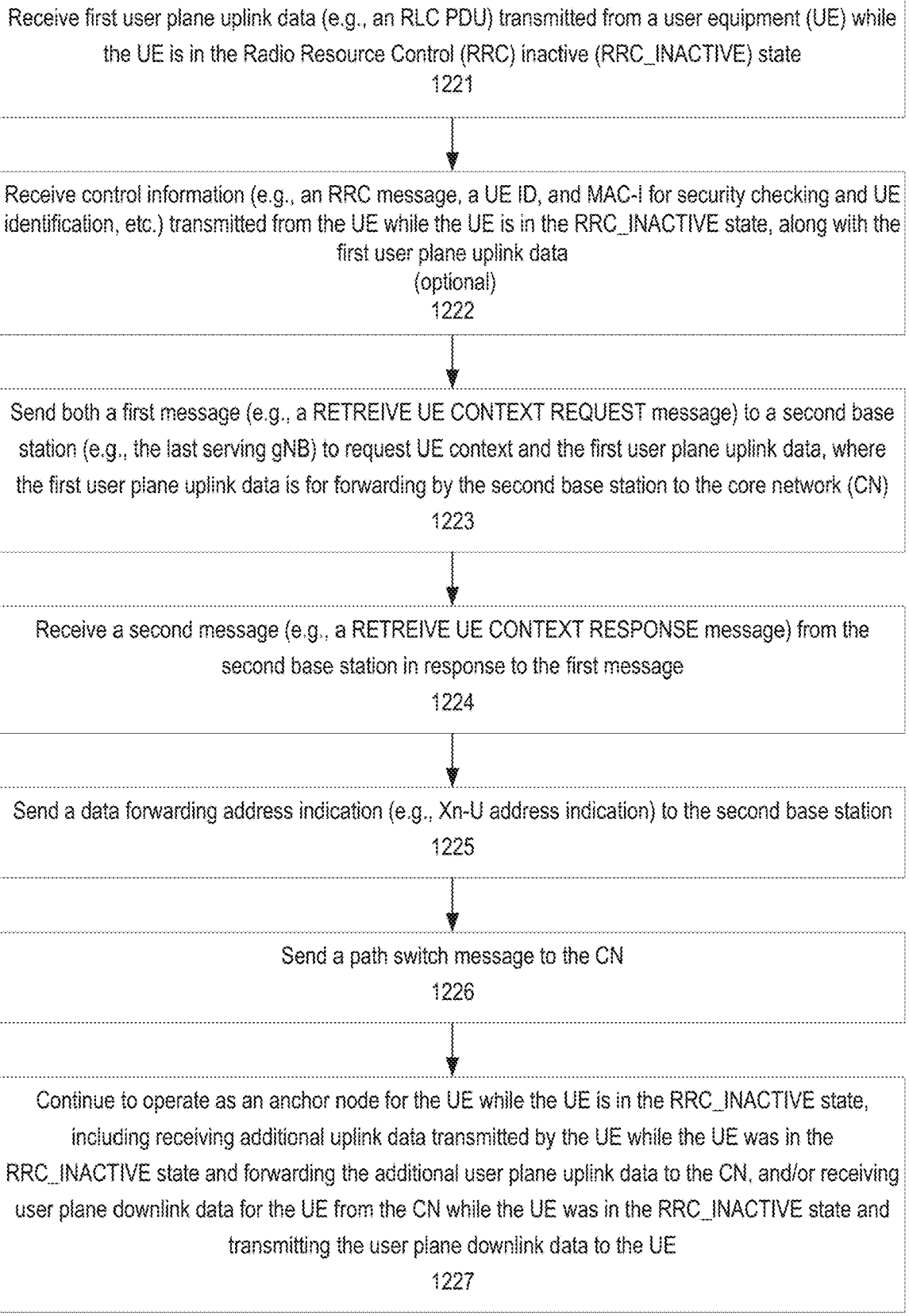
FIG. 12B is a flow diagram of another embodiment of a process performed by a new gNB for handling a user plane uplink data sent from a UE while the UE is in the RRC_INACTIVE state.

FIG. 12B is a flow diagram of another embodiment of a process performed by a new gNB for handling a user plane uplink data sent from a UE while the UE is in the RRC_INACTIVE state. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by new gNB 902B of FIG. 9.

Referring to FIG. 12B, the process begins by processing logic receiving first user plane uplink data transmitted from a user equipment (UE) while the UE was in the RRC_INACTIVE state (processing block 1221). In some embodiments, the first user plane uplink data is sent as an RLC PDU.

In some embodiments, processing logic also receives control information transmitted from the UE while the UE was in the Radio RRC_INACTIVE state, along with the first user plane uplink data (processing block 1222). In some embodiments, the control information includes one or more of an RRC message, a UE ID, and MAC-I for security checking and UE identification.

In response to receiving the information, processing logic sends both a first message to a second base station (e.g., the last serving gNB) to request UE context and the first user plane uplink data, where the first user plane uplink data is for forwarding by the second base station to the core network (CN) (processing block 1223). In some embodiments, the first message is a RETRIEVE UE CONTEXT REQUEST message. In some embodiments, the first user plane uplink data is sent as part of the message requesting UE context (e.g., carried in the same container). In another embodiment, the first user plane uplink data is sent together with the message requesting UE context. In some embodiments, the first user plane uplink data is sent as an RLC PDU.

Subsequently, processing logic receives a second message from the second base station in response to the first message (processing block 1224). In some embodiments, the second message comprises a RETRIEVE UE CONTEXT RESPONSE message.

Processing logic also sends a data forwarding address indication (e.g., an Xn-U address indication) to the second base station (processing block 1225) and sends a path switch message to the CN (processing block 1226).

Thereafter, processing logic operates the base station as an anchor node for the UE while the UE is in the RRC_INACTIVE state, including receiving additional uplink data transmitted by the UE while the UE was in the RRC_INACTIVE state and forwarding the additional user plane uplink data to the CN, and/or receiving user plane downlink data for the UE from the CN while the UE was in the RRC_INACTIVE state and transmitting the user plane downlink data to the UE (processing block 1227).

Figure 13A:
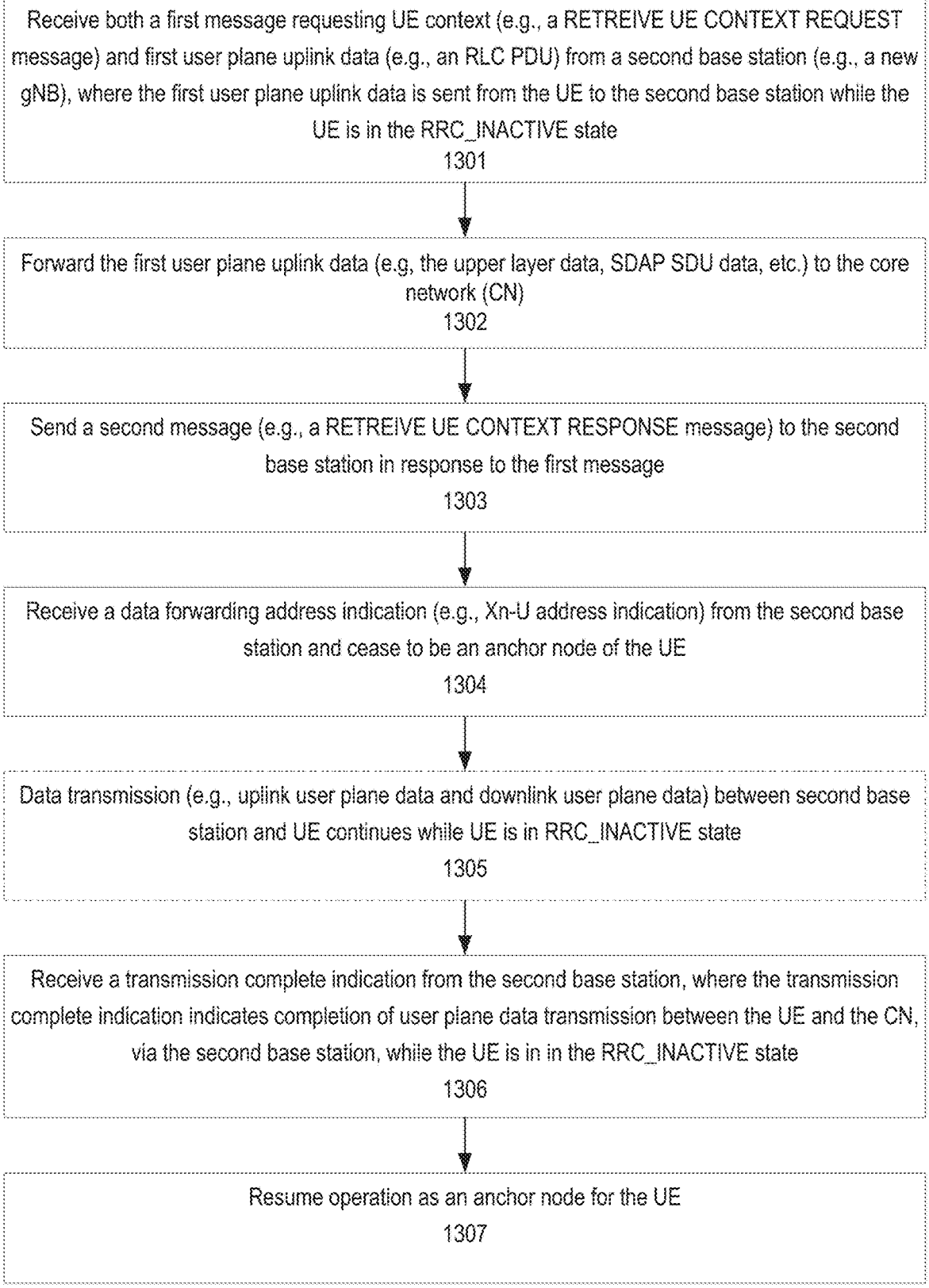
FIG. 13A is a flow diagram of yet another embodiment of a process performed by a last serving gNB for handling a user plane uplink data sent from a UE while the UE is in the RRC_INACTIVE state.

FIG. 13A is a flow diagram of yet another embodiment of a process performed by a last serving gNB for handling a user plane uplink data sent from a UE while the UE is in the RRC_INACTIVE state. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by last serving gNB 1002C of FIG. 10.

Referring to FIG. 13A, the process begins by processing logic receiving both a first message requesting UE context and first user plane uplink data from a second base station (e.g., a new gNB), where the first user plane uplink data is sent from the UE to the second base station while the UE is in the RRC_INACTIVE state (processing block 1301). In some embodiments, the first message is a RETRIEVE UE CONTEXT REQUEST message. In some embodiments, the first user plane uplink data is sent as part of the message requesting UE context (e.g., carried in the same container). In another embodiment, the first user plane uplink data is sent together with the message requesting UE context. In some embodiments, the first user plane uplink data is sent as an RLC PDU.

Processing logic forwards the first user plane uplink data to the core network (CN) (processing block 1302). In some embodiments, the first user plane uplink data is sent to the CN as upper layer data (e.g., SDAP SDU data).

Processing logic also sends a second message to the second base station in response to the first message (processing block 1303). In some embodiments, the second message comprises a RETRIEVE UE CONTEXT RESPONSE message.

Next, processing logic receives a data forwarding address indication (e.g., Xn-U address indication) from the second base station and ceases to be an anchor node of the UE (processing block 1304).

Thereafter, data transmission (e.g., uplink user plane data, downlink user plane data) between the second base station and the UE occurs while the UE is in the RRC_INACTIVE state (processing block 1305).

Subsequently, processing logic receives a transmission complete indication from the second base station, where the transmission complete indication indicates completion of user plane data transmission between the UE and the CN, via the second base station, while the UE is in in the RRC_INACTIVE state (processing block 1306) and resumes operation as an anchor node for the UE (processing block 1307).

FIG. 13B is a flow diagram of yet another embodiment of a process performed by a new gNB for handling a user plane uplink data sent from a UE while the UE is in the RRC_INACTIVE state. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by new gNB 1002B of FIG. 10.

Referring to FIG. 13B, the process begins by processing logic receiving first user plane uplink data transmitted from a UE while the UE was in the RRC_INACTIVE state (processing block 1321). In some embodiments, the first user plane uplink data is sent as part of the message containing the control information. In another embodiment, the first user plane uplink data is sent together with a message containing the control information. In some embodiments, the first user plane uplink data is sent as an RLC PDU.

In some embodiments, processing logic also receives control information transmitted from the UE while the UE is in the RRC_INACTIVE state, along with the first user plane uplink data (processing block 1322). In some embodiments, the control information includes one or more of an RRC message, a UE ID, and MAC-I for security checking and UE identification.

In response to receipt of this information, processing logic sends both a first message to a second base station (e.g., the last serving gNB) to request UE context and the first user plane uplink data, where the first user plane uplink data is for forwarding by the second base station to the core network (CN) (processing block 1323). In some embodiments, the second message comprises a RETRIEVE UE CONTEXT REQUEST message.

Processing logic also receives a second message from the second base station in response to the first message, where the second message contains partial context to enable the second base station to operate as an anchor node for the UE (processing block 1324). In some embodiments, the second message comprises a RETRIEVE UE CONTEXT RESPONSE message.

Processing logic sends a data forwarding address indication (e.g., Xn-U address indication) to the second base station (processing block 1325) and a path switch message to the CN (processing block 1326).

Thereafter, processing logic causes the base station to temporarily operate as an anchor node for the UE while the UE is in the RRC_INACTIVE state, including receiving additional uplink data transmitted by the UE while the UE was in the RRC_INACTIVE state and forwarding the additional user plane uplink data to the CN, and/or receiving user plane downlink data for the UE from the CN while the UE is in the RRC_INACTIVE state, assembling the user plane downlink data from the second base station, and transmitting assembled user plane downlink data to the UE as a downlink transmission (processing block 1327).

Subsequently, processing logic sends a transmission complete indication to the second base station and ceases operation as an anchor node for the UE, where the transmission complete indication indicates completion of user plane data transmission between the UE and the CN while the UE is in in the RRC_INACTIVE state (processing block 1328).

In some embodiments described above, the new gNB requests the context for the UE in response to receiving an indication of data transmission for the UE in the INACTIVE state. In another embodiment, the last serving gNB sends (e.g., broadcasts) the UE context to potential new gNB prior to a gNB receiving an indication of the data transmission. In this embodiment, the potential new gNBs are caching the UE context in the event that the UE is to perform a data transmission with that gNB. The indication of an upcoming data transmission can be either an UL transmission from the UE or a DL transmission from the CN.

Figure 14A:
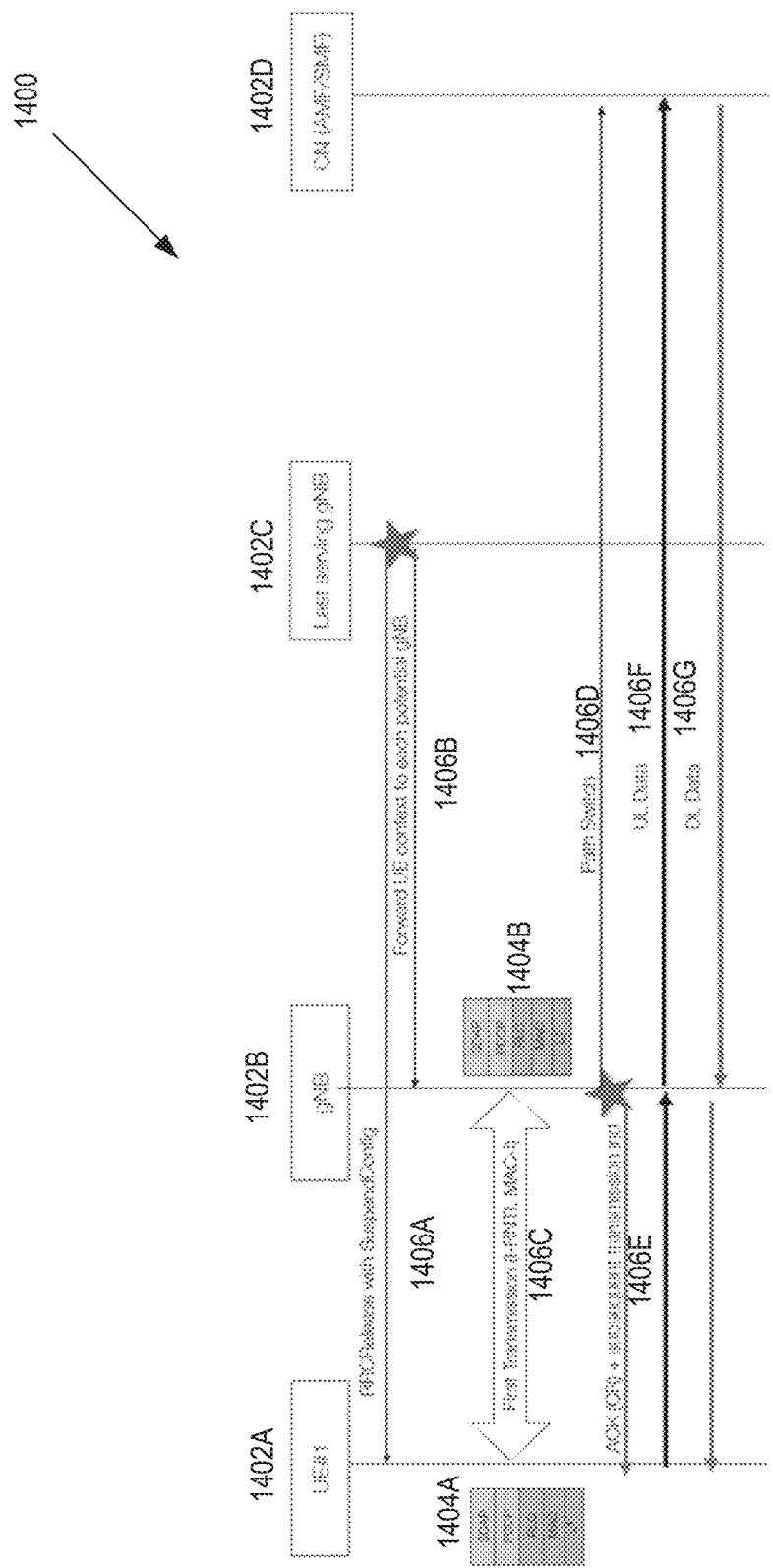
FIGS. 14A and 14B illustrate some embodiments of communicating data with a UE in the inactive state, where a last served gNB sends a UE context to another gNB prior to receiving data.
Figure 14B:
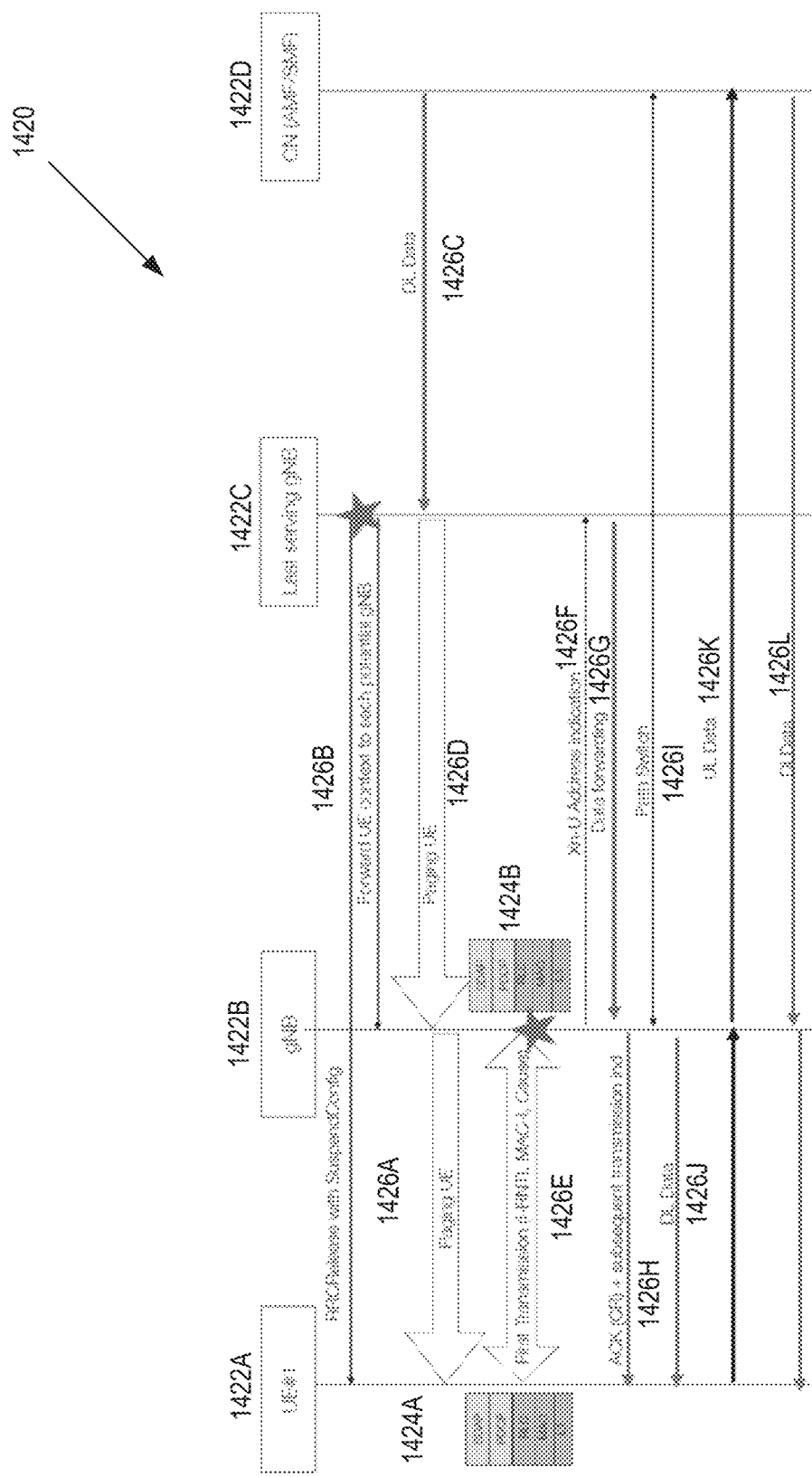

FIGS. 14A and 14B illustrate some embodiments of communicating data with a UE in the INACTIVE state, where a last served gNB sends a UE context to another gNB prior to receiving data. Referring to FIG. 14A, the last serving gNB 1402C sends a RRCRelease with SuspendConfig message 1406A to UE 1402A. The last serving gNB 1402C also sends UE context information 1406B to each potential gNB.

Subsequently, UE 1402A transmits user plane uplink data as part of transmission 1406C to gNB 1402B. In response, gNB 1402B sends a Path Switch message 1406D to CN 1402D. At this point, the anchor node is relocated from the last serving gNB 1402 to gNB 1402B. Thereafter, uplink data from UE 1402A is sent to gNB 1402B, which forwards UL data 1406F to CN 1402D, and downlink data 1406G from CN 1402D is sent to gNB 1402B, which forwards DL data to UE 1402A.

However, the process in FIG. 14A waits once the last serving gNB sends the UE context information to potential gNBs until the UE transmits data while in the INACTIVE state. However, during this time, if the CN has downlink data for the UE prior to the UE transmitting data during the INACTIVE state, the process is FIG. 14B in use to handle the download data transfer.

Referring to FIG. 14B, as with FIG. 14A, the last serving gNB 1422C sends a RRCRelease with SuspendConfig message 1426A to UE 14s2A. The last serving gNB 14s2C also sends UE context information 14s6B to each potential gNB.

While waiting for an user plane uplink data transmission from UE 1422A while in the INACTIVE state, CN 1422D sends DL data 1426C to the last serving gNB 1422C. In response to DL data 1426C, the last serving gNB 1422C sends a paging message 1426D to UE 1422A, which the potential gNBs, including dNB 1422B, hears and then sends a paging message 1424A to UE themselves.

Subsequently, in response to the paging message 1424A, UE 1422A performs a data transmission to gNB 1422B while in the INACTIVE state, and in response thereto, the anchor changes to gNB 1422B and the new gNB 1422B sends a data forwarding indication (e.g., Xn-U Address Indication 1426F) to the last serving gNB 1422C and a Path Switch message 1426I to CN 1422D. In response to the data forwarding indication (e.g., Xn-U Address Indication 1426F), the last serving gNB 1422C performs a data forwarding operation 1426G to forward the DL data 1426C to gNB 1422B for forwarding as DL data 1426I to UE 1422A.

Thereafter, uplink data from UE 1422A is sent to gNB 1422B, which forwards UL data 1426K to CN 1402D, and downlink data 1426L from CN 1422D is sent to gNB 1422B, which forwards DL data to UE 1422A.

Figure 15A:
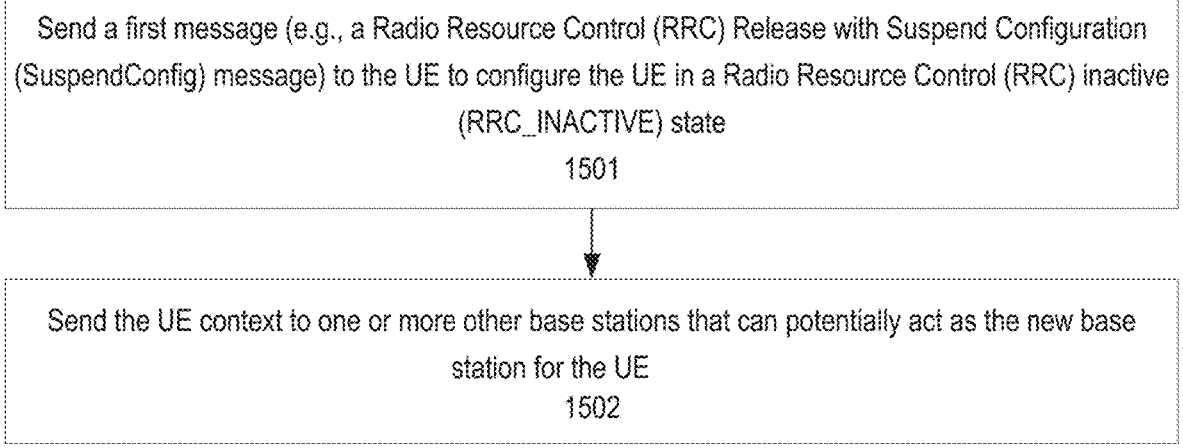
FIG. 15A is a flow diagram of another embodiment of a process performed by a last serving gNB for handling sends a UE context to another gNB prior to receiving user plane uplink data from a UE while the UE is in the RRC_INACTIVE state.

FIG. 15A is a flow diagram of another embodiment of a process performed by a last serving gNB for handling sends a UE context to another gNB prior to receiving user plane uplink data from a UE while the UE is in the RRC_INACTIVE state. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by last serving gNB 1402C of FIG. 14A.

Referring to FIG. 15A, processing logic sends a first message to the UE to configure the UE in a Radio Resource Control (RRC) inactive (RRC_INACTIVE) state (processing block 1501). In some embodiments, the first message comprises a Radio Resource Control (RRC) Release with Suspend Configuration (SuspendConfig) message.

Processing logic also sends the UE context to one or more other base stations that can potentially act as the new base station for the UE (processing block 1502). At this point, the UE may send uplink user plane data to a new gNB while the UE is in the RRC_INACTIVE state.

Figure 15B:
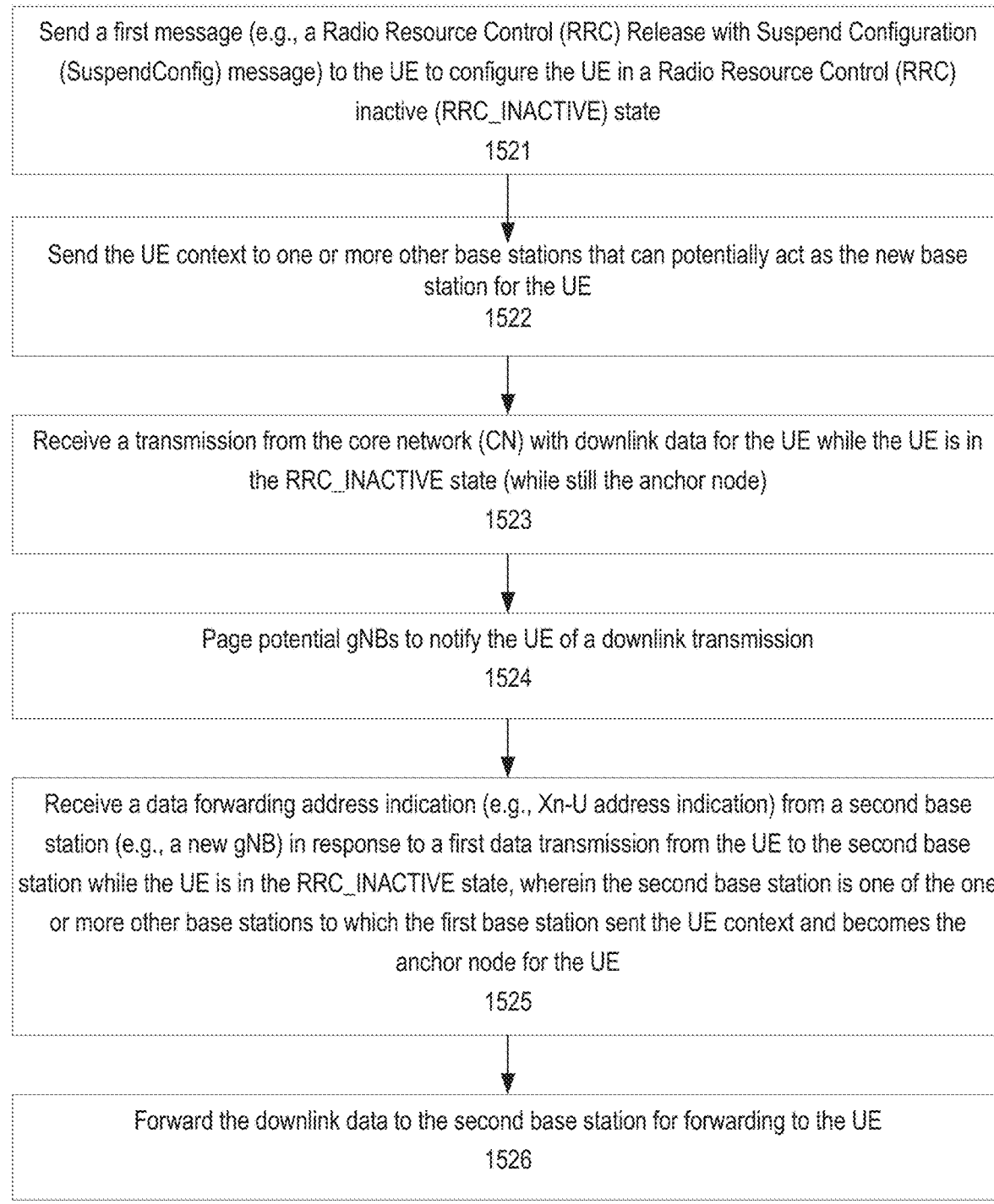
FIG. 15B is a flow diagram of one embodiment of a process for handling new downlink data from the CN that is sent to the last serving gNB prior to the UE sending data to the new gNB while the UE is in the RRC_INACTIVE state.

At times, new downlink data from the CN may be sent to the last serving gNB prior to the UE sending data to the new gNB while the UE is in the RRC_INACTIVE state. FIG. 15B is a flow diagram of one embodiment of a process for handling new downlink data from the CN that is sent to the last serving gNB prior to the UE sending data to the new gNB while the UE is in the RRC_INACTIVE state. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by last serving gNB 1422C of FIG. 14B.

Referring to FIG. 15B, processing logic sends a first message to the UE to configure the UE in a Radio Resource Control (RRC) inactive (RRC_INACTIVE) state (processing block 1521). In some embodiments, the first message comprises a Radio Resource Control (RRC) Release with Suspend Configuration (SuspendConfig) message.

Processing logic also sends the UE context to one or more other base stations that can potentially act as the new base station for the UE (processing block 1522).

Then, processing logic receives a transmission from the CN with downlink data for the UE while the UE is in the RRC_INACTIVE state (processing block 1523).

In response to the downlink data, processing logic pages nearby gNBs (e.g., gNBs within range) to notify the UE of a downlink transmission (processing block 1524). At this point, that potential new gNBs for the UE that received the page, in turn, page the UE.

Subsequently, processing logic receives a data forwarding address indication (e.g., Xn-U address indication) from a second base station (e.g., a new gNB) in response to a first data transmission from the UE to the second base station while the UE is in the RRC_INACTIVE state, where the second base station is one of the one or more other base stations to which the first base station sent the UE context and becomes the anchor node for the UE (processing block 1525).

In response to receiving the data forwarding address indication, processing logic forwards the downlink data to the second base station for forwarding to the UE (processing block 1526).

Figure 16A:
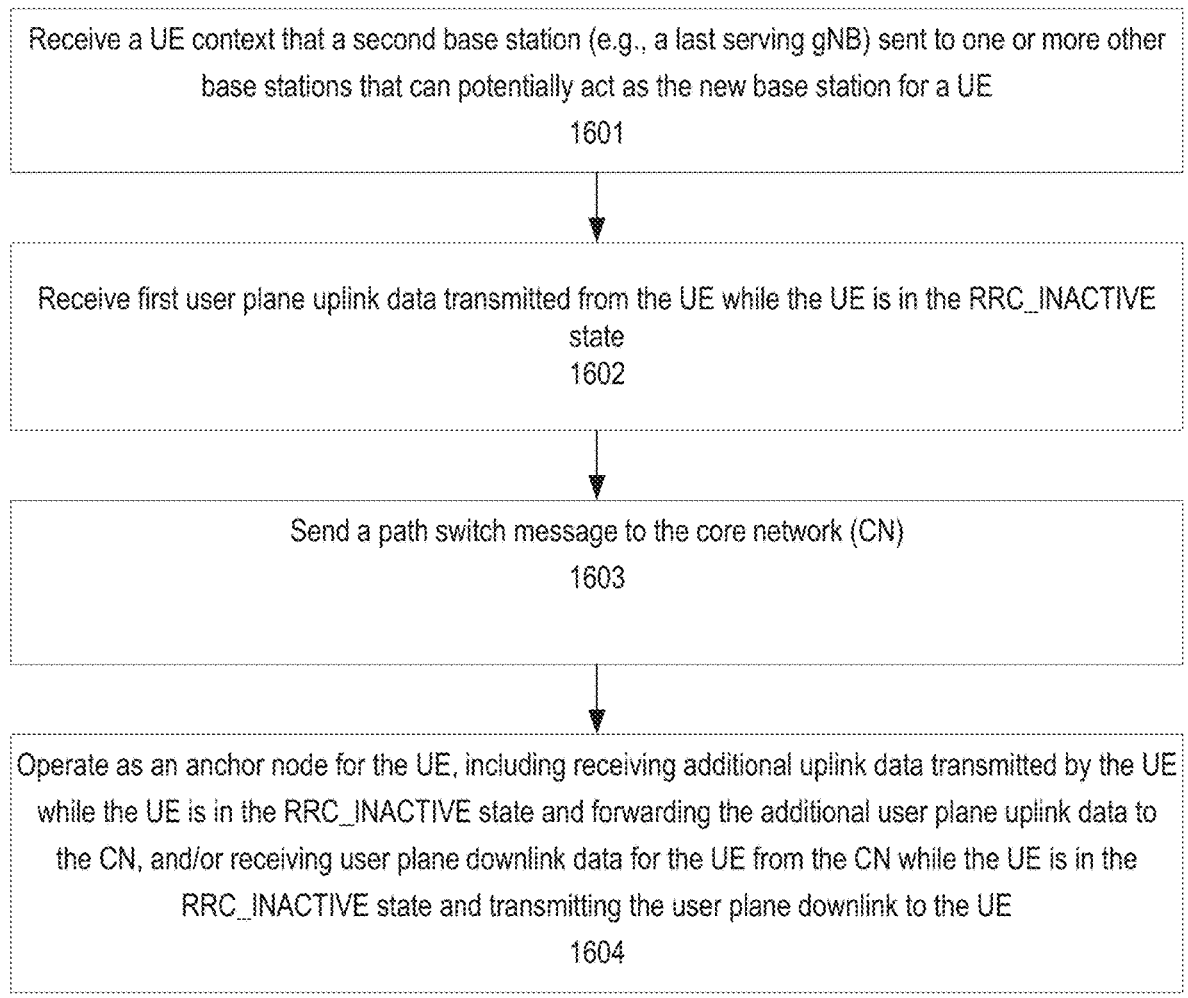
FIG. 16A is a flow diagram of yet another embodiment of a process performed by a last serving gNB for handling sends a UE context to another gNB prior to receiving user plane uplink data from a UE while the UE is in the RRC_INACTIVE state.

FIG. 16A is a flow diagram of yet another embodiment of a process performed by a last serving gNB for handling sends a UE context to another gNB prior to receiving user plane uplink data from a UE while the UE is in the RRC_INACTIVE state. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by new gNB 1402B of FIG. 14A.

Referring to FIG. 16A, the process begins by processing logic receiving a UE context that a second base station (e.g., a last serving gNB) sent to one or more other base stations that can potentially act as the new base station for a UE (processing block 1601).

Processing logic also receives first user plane uplink data transmitted from the UE while the UE is in the RRC_INACTIVE state (processing block 1602).

In response, processing logic sends a path switch message to the core network (CN) (processing block 1603) and thereafter operates as an anchor node for the UE, which may include receiving additional uplink data transmitted by the UE while the UE is in the RRC_INACTIVE state and forwarding the additional user plane uplink data to the CN, and/or may include receiving user plane downlink data for the UE from the CN while the UE is in the RRC_INACTIVE state and transmitting the user plane downlink to the UE (processing block 1604).

FIG. 16B is a flow diagram of another embodiment of a process for handling new downlink data from the CN that is sent to the last serving gNB prior to the UE sending data to the new gNB while the UE is in the RRC_INACTIVE state. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by last serving gNB 1422C of FIG. 14B.

Referring to FIG. 16B, the process begins by processing logic receiving a UE context that a second base station (e.g., a last serving gNB) sends to one or more other base stations that can potentially act as the new base station for a UE (processing block 1621).

Next, processing logic receives a paging message from the second base station indicating that a transmission from CN with downlink data has occurred while the UE is in the RRC_INACTIVE state (processing block 1622) and, in response thereto, pages the UE to notify the UE of a downlink transmission (processing block 1623).

Subsequently, processing logic receives first user plane uplink data transmitted from the UE while the UE is in the RRC_INACTIVE state and thereafter operates as an anchor node for the UE in response to receiving the first user plane uplink data from the UE (processing block 1624).

Processing logic sends a data forwarding address indication (e.g., Xn-U address indication) to the second base station after receiving the first user plane uplink data transmitted from the UE while the UE is in the RRC_INACTIVE state (processing block 1625).

Processing logic receives the downlink data from the second base station while the UE is in the RRC_INACTIVE state (processing block 1626), sends a path switch message to the core network (CN) and operates as an anchor node for the UE (processing block 1627), and transmits the downlink data to the UE (processing block 1628).

Thereafter, processing logic receives additional uplink data transmitted by the UE while the UE is in the RRC_INACTIVE state and forward the additional user plane uplink data to the CN, and/or receive user plane downlink data for the UE from the CN while the UE is in the RRC_INACTIVE state and transmit the user plane downlink to the UE (processing block 1629).

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "sending," "receiving," "switching," "receiving," "communicating," "transmitting," "aggregating," "monitoring," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A first base station comprising one or more processors and being the last serving base station for a user equipment (UE) before the UE enters a Radio Resource Control (RRC) inactive (RRC_INACTIVE) state, the one or more processors configured to perform operations comprising:
   receiving both a first message requesting UE context and first user plane uplink data from a second base station, the first user plane uplink data sent from the UE to the second base station while the UE is in the RRC_INACTIVE state;
   receiving a data forwarding address indication from the second base station; and
   forwarding UE context information to the second base station in response to receiving the data forwarding address indication from the second base station, to enable the second base station to become an anchor of the UE.

2. The first base station of claim 1 wherein the first user plane uplink data is in the first message.

3. The first base station of claim 1 wherein the first user plane uplink data is received with the first message but outside of the first message.

4. The first base station of claim 1 wherein the first message is a RETREIVE UE CONTEXT REQUEST message.

5. The first base station of claim 1 wherein the operations further comprise
   sending a second message to the second base station in response to the first message.

6. The first base station of claim 5 wherein the second message comprises a RETREIVE UE CONTEXT RESPONSE message.

7. The first base station of claim 1 wherein the first user plane uplink data received with the first message requesting UE context from the second base station comprises a Radio Link Control (RLC) packet data unit (PDU), and wherein the operations further comprise performing RLC, Packet Data Convergence Protocol (PDCP), and Service Data Adaptation Protocol (SDAP) operations to decode the RLC PDU.

8. The first base station of claim 7 further comprising: forwarding the first user plane uplink data to the core network (CN) comprises forwardingwith upper layer data via a PDU Session Tunnel.

9. The first base station of claim 8 wherein the first user plane uplink data received from the second base station is an RLC PDU and the upper layer data comprises SDAP SDU data.

10. The first base station of claim 1, further comprising in response to receiving the first message, transmitting a RETRIEVE CONTEXT RESPONSE message to the second base station.

11. The first base station of claim 1 wherein the operations further comprise:
    after forwarding the UE context information from the second base station, receiving a data forwarding indication from the second base station.

12. The first base station of claim 11 wherein the user plane downlink data being forwarded as one or more RLC PDUs.

13. The first base station of claim 1 wherein the operations further comprise:
switching to a temporary path to the CN; and
after UE context information is forwarded to the second base station, deleting the UE context and the temporary path.

14. The first base station of claim 6 wherein the operations further comprise:
receiving a transmission complete indication from the second base station, the transmission complete indication to indicate completion of user plane data transmission between the UE and the CN, via the second base station, while the UE is in in the RRC_INACTIVE state; and
resuming operation as an anchor node for the UE.

15. A method performed by a first base station, wherein the first base station is a last serving base station for a user equipment (UE) before the UE enters a Radio Resource Control (RRC) inactive (RRC_INACTIVE) state, the method comprising:
receiving both a first message requesting UE context and first user plane uplink data from a second base station, the first user plane uplink data sent from a UE to the second base station while the UE is in the RRC_INACTIVE state; and
receiving a data forwarding address indication from the second base station; and
forwarding UE context information to the second base station in response to receiving the data forwarding address indication from the second base station, to enable the second base station to become an anchor of the UE.

16. A baseband processor of a first base station, wherein the first base station is a last serving base station for a user equipment (UE) before the UE enters a Radio Resource Control (RRC) inactive (RRC_INACTIVE) state, wherein the baseband processor is configured to cause the first base station to perform operations comprising:
receiving both a first message requesting UE context and first user plane uplink data from a second base station, the first user plane uplink data sent from the UE to the second base station while the UE is in the RRC_INACTIVE state;
receiving a data forwarding address indication from the second base station; and
forwarding UE context information to the second base station in response to receiving the data forwarding address indication from the second base station, to enable the second base station to become an anchor of the UE.

17. The baseband processor of claim 16 wherein the first user plane uplink data is in the first message.

18. The baseband processor of claim 16 wherein the first user plane uplink data is transmitted with the first message but outside of the first message.

19. The baseband processor of claim 16 wherein the first message is a RETREIVE UE CONTEXT REQUEST message.

* * * * *